(12) United States Patent
Burke et al.

(10) Patent No.: US 12,549,081 B2
(45) Date of Patent: Feb. 10, 2026

(54) HOMO-POLAR DC ELECTRIC GENERATOR WITH POSITIVE ELECTROMAGNETIC AND POSITIVE ELECTRO-MECHANICAL FEEDBACK

(71) Applicants: Douglas Burke, Newport Beach, CA (US); Rod L King, Littleton, CO (US); Ronald Clyde Idol, Crawfordville, FL (US)

(72) Inventors: Douglas Burke, Newport Beach, CA (US); Rod L King, Littleton, CO (US); Ronald Clyde Idol, Crawfordville, FL (US)

( * ) Notice: Subject to any disclaimer, the term of this patent is extended or adjusted under 35 U.S.C. 154(b) by 410 days.

(21) Appl. No.: 17/300,271

(22) Filed: May 4, 2021

(65) Prior Publication Data

US 2021/0367496 A1    Nov. 25, 2021

Related U.S. Application Data

(60) Provisional application No. 63/101,635, filed on May 9, 2020.

(51) Int. Cl.
*H02K 31/02* (2006.01)

(52) U.S. Cl.
CPC ................... *H02K 31/02* (2013.01)

(58) Field of Classification Search
CPC ........ H02K 31/00; H02K 31/02; H02K 31/04; H02K 16/00; H02K 55/00; H01R 39/00; H01R 39/24
See application file for complete search history.

(56) References Cited

U.S. PATENT DOCUMENTS

2011/0309708 A1* 12/2011 Van Neste ............. H02K 31/00
                                                        310/178

FOREIGN PATENT DOCUMENTS

CN          2114238 U  *  8/1992

* cited by examiner

*Primary Examiner* — Tran N Nguyen

(57) ABSTRACT

A system consisting of a magnet mounted on a shaft wherein both North and South poles are enclosed within the volume of a cylindrical coil and said shaft is spun by mechanical means thereby producing a current in said coil primarily by way of the Lorentz force and as said system slows down there is inherent positive Electro-magnetic and Electro-mechanical feedback.

10 Claims, 16 Drawing Sheets

HOMO-POLAR DC ELECTRIC GENERATOR WITH POSITIVE ELECTROMAGNETIC AND POSITIVE ELECTRO-MECHANICAL FEEDBACK

BACKGROUND OF THE INVENTION

This invention relates to a method and system of converting mechanical energy into electrical energy to charge a battery or to be applied to any device requiring the flow of electric charge to function. Such systems are known as electric generators or electro-magnetic generators or electro-mechanical generators.

In general, most systems in the prior art exploit Faraday's law to convert mechanical kinetic energy into electric potential energy. This requires creating an arrangement of coils and magnets in combination such that the mechanical motion either of magnet or coils or a combination thereof results in in a time changing magnetic flux through the cross-sectional area defined by the turns or wire loops of the coils. Then by Faraday's Law an electric potential appears between the two opposing wire ends of the coils. The electric potential is also referred to as a voltage or an electro-motive force. The electro-motive force is also referred to as an EMF in the literature relating to electromagnetism. Stated mathematically Faraday's law is written as $\mathcal{E}=-d\Phi_B/dt$. In this equation $\Phi_B$ is the magnetic flux through the coil loops. $\mathcal{E}$ is the EMF or voltage between the wire ends of the coils.

The proposed invention is very different than these other electric generators. In the proposed invention There are critical conditions that are absent in the prior art. In particular the unobvious critical condition is that the magnetic flux through the coils $\Phi_B$ is constant. This means $d\Phi_B/dt$ is zero and Faraday's law says that the voltage induced between the wire ends of the coil $\mathcal{E}$ is zero. In the proposed invention $\mathcal{E}$ however is not zero as predicted by Faraday's Law thus making the invention unobvious. Further in the operation of the invention the EMF induced in the coils is not due to Faraday's Law but is however due to the Lorentz force on electrons in the metal out of which the conducting coils are composed. Since the Lorentz force does no work on electrons because it is in a direction perpendicular to the motion of said electrons the proposed electric generator is more energy efficient than those generators that have preceded it. Further the novel arrangement of coils and magnets allows the Lorentz force to be the primary source of electron motion and as a secondary action Faraday's Law serves to keep the generator spinning instead of causing it to slow down as in previous generators. Therefore, the electromagnetic drag from Faraday's Law is present in those generators in the prior art that are AC generators and absent in this drag is absent in the proposed invention.

Referring to FIG. 1 what is shown is a permanent magnet 41 with north 43 and south 45 poles. Further included are the magnetic field lines 47. This invention relates to a novel use of a permanent magnet. The magnetic field lines of a permanent magnet are called a magnetic dipole field.

Referring to FIG. 2 what is shown is a permanent magnet 51 near a wire loop 53. Said magnet has both south 63 and north 65 poles with magnetic fields shown as the vector fields 55 and 67. The leading portion of the magnetic field which initially enters the area defined by said loop is defined as $B_i$ and is shown as 55. If the magnet moves in the direction of the loop with the north pole closest to the loop an electric field 59 is induced in the loop which creates a current I 61 in the loop. This current produces a second magnetic field $B_r$ 57 which opposes the initial magnetic field $B_i$ 55 from the permanent magnet. The fact that these two fields oppose each other means that as you push the magnet towards the loop with your hand you will feel the secondary magnetic field $B_r$ 57 exerting a force on the magnet in your hand and pushing your hand away from the loop in a direction opposite to the direction towards the loop which is the direction you are pushing it. This is mother nature making you work to get the current I 61 out of the loop. So, Faraday's Law enables you to convert the mechanical energy of a moving magnet into an electrical current which comprises electrical energy. However, the very nature of Faraday's Law is that the loop reacts with a magnetic field in such a way so as to fight the initial imposed magnetic field of the moving permanent magnet. Faraday's Law is stated above and can also be stated with the electric field in the equation mathematically as $$\mathcal{E} = \int (\vec{E}) \cdot \vec{\delta r} = -\frac{d\Phi}{dt}$$

where $\Phi$ is the magnetic flux through the loop and $\int (\vec{E}) \cdot \vec{\delta r}$ is the line integral of the induced electric field around the path defined by the loop. $\mathcal{E}$ is the induced emf around the loop. Faraday's Law is the basis for most electric generators which convert a time changing magnetic flux into a time changing electric field which produces time changing currents. Therefore, it is employed to take mechanical kinetic energy and convert it into electrical energy, but the electrical energy has a time derivative that is nonzero. All AC generators are an application of Faraday's Law. The proposed invention does not employ Faraday's Law to convert mechanical kinetic energy into electrical energy primarily. The proposed invention is a DC generator not an AC generator. Faraday's comes into an play as a secondary effect in the proposed invention in such a way as to help enhance the creation of electric energy instead of fighting the creation of electric energy like it does in time changing of AC generators.

The proposed invention is an application of the law of nature known as the Lorentz Force which stated mathematically is $F=q\vec{v}\times\vec{B}$. This means that moving electric charges q are deflected by magnetic fields B because they experience a force perpendicular to their velocity v. Equivalently a moving magnetic field will deflect a stationary electric charge.

The proposed invention is a DC electric generator which converts rotational mechanical kinetic energy into electrical energy by way of a DC voltage which can deliver DC current. The class of such devices are the early DC generators which originated with the Faraday disk invented by Michael Faraday and later improved upon by Nikola Tesla as well as many others thereafter. Such devices are referred to in the literature as a Faraday Disk Electric Generators, DC Electric Dynamos, Homopolar Electric Generators, Homopolar DC Electric Generators and Unipolar Electric Generators. The basic principle behind these devices can be illustrated in FIG. 3.

Referring to FIG. 3 what is shown is a cylindrical shaft 75 with a disk 77 mounted thereon, said shaft being a cylinder and said disk being a cylinder of lesser height and larger diameter, and said cylinders both having common geometric axes. Said shaft being suspended by a bearing assembly which constrains the shaft so that it can only spin about its axis and no other motion is possible. Said bearing assembly not being shown for its presence in the figure is not necessary to elucidate the function of faraday's invention. Further included in FIG. 3 are a north pole 69 and a south pole 71 of a permanent magnet arranged so as to provide a magnetic field $B_o$ 73 which is parallel to the axis of said shaft 75 and everywhere perpendicular to the planar area defined by said disk 77. The aforementioned are the basic structures of Faraday's invention. The operation of the Faraday disk is seen when the shaft disk system is given mechanical rotation by some external means. Imagine that you are looking at the plane of the disk along the line of sight from the north pole of said permanent magnet towards the south pole of said permanent magnet and from that perspective you see the disk spinning counterclockwise with an angular frequency $\omega$ 79. Said disk is composed of a metallic conducting material wherein electrons, which have negative electric charge, are free to move. Again, looking in the direction specified wherein said disk is seen spinning counterclockwise said electrons will be moving in circles in a counterclockwise direction as viewed from said north pole towards said south pole. These electrons will experience a Lorentz Force in a direction which is from the shaft towards the periphery of said disk causing an accumulation of electrons 81 at the outer edge of said disk and an accumulation of positive charge 83 at the center region of said disk. These electrons 81 because of their circular motion will generate a secondary magnetic field $B_1$ 85 which is parallel to the field of said permanent magnet $B_o$ 73. As the Faraday disk begins to slow down because of friction in the bearings the total magnetic field cutting through the plane of the disk which is the sum of $B_o$ 73 and $B_1$ 85 starts decreasing with time. As this happens the magnetic flux through the plane of said disk in a direction from said North pole to said south pole starts decreasing with time. This causes the creation of an electric field E 87 by way of Faraday's Law of induction at the edge of said disk and tangent to the edge of said disk in a clockwise sense when viewed as looking from said north pole piece towards said south pole piece. Said electric field E 87 exerts a force 89 on the electrons 81 that are gathered at the periphery of said disk. This force 89 exerts a torque on said disk which serves as positive mechanical feedback to keep the disk spinning in its original counterclockwise direction as viewed from said north pole towards said south pole. The result is that an electric potential difference or voltage is generated between the periphery of said disk and said shaft. Upon placing electrical contacts at said disk periphery and said shaft electrical current can be drawn out of the system and mechanical rotational energy has been converted into electrical energy. The Faraday disk was invented by Michael Faraday in 1831 and like the proposed invention it does not suffer from the electromagnetic drag of all AC generators. Also like the proposed invention it has positive electro-mechanical feedback.

The proposed invention is an unobvious novel Faraday Disk generator wherein said external pole pieces are absent, said disk is itself a permanent magnet, and a said disk-shaft system is enclosed inside a cylindrical coil of conductive windings wherein the cylindrical shape of said windings has an axis that is coincidental and parallel with the axis of said shaft. The result is a DC Homopolar electric generator with positive electro-magnetic and electro-mechanical feedback. The difference of the proposed invention from the Faraday disk and other DC generators, in its function, is by way of a novel arrangement of structures the proposed invention produces an electric current directly which is a flow of electrons by way of the Lorentz force and the proposed invention also has the combination of electro-magnetic and electro-mechanical feedback working together to enhance performance. This combination is absent in the previous DC generators.

Objects and Advantages (a) The proposed invention does not have the electromagnetic drag associated with time dependent AC generators which employ Faraday's Law to generate the electric current.
(b) The Proposed invention exploits the Lorentz Force to generate an electric current directly without having to use brushes as is required in other homopolar devices.
(c) In the proposed invention Faraday's Law serves to generate an electric field that keeps the electric current generated going in the same direction as the Faraday disk structure of the proposed invention begins to slow because of friction. This is novel positive electro-magnetic feedback.
(d) Faraday's Law serves to generate an electric field that exerts a mechanical torque that keeps the Faraday disk structure spinning in the same direction as the Faraday disk structure of the proposed invention begins to slow because of friction. This is novel positive electro-mechanical feedback because it co-exists with said electro-magnetic feedback.

PRIOR ART

The following patent numbers are DC generators that are evolutions of the Faraday disk which is a Homopolar DC generator. The specific combination of positive electro-mechanical and positive electro-magnetic feedback of the proposed invention that is described in the following pages is absent in the prior art.

| PATENT NUMBER | INVENTOR, date | Is the Positive Electro-magnetic and Electro-Mechanical Feedback method of the proposed Invention Present??? |
| --- | --- | --- |
| No Pat No Available | Faraday 1831, Faraday Disk | No |
| U.S. Pat. No. 211,311 | Weston 1879 | No |
| U.S. Pat. No. 334,823 | Tesla 1886 | No |
| U.S. Pat. No. 359,748 | Tesla 1887 | No |
| U.S. Pat. No. 390,414 | Tesla 1888 | No |
| U.S. Pat. No. 390,415 | Tesla 1888 | No |
| U.S. Pat. No. 390,721 | Tesla 1889 | No |
| U.S. Pat. No. 406,968 | Tesla 1889 | No |
| U.S. Pat. No. 530,717 | Platt 1894 | No |

-continued

| PATENT NUMBER | INVENTOR, date | Is the Positive Electro-magnetic and Electro-Mechanical Feedback method of the proposed Invention Present??? |
|---|---|---|
| U.S. Pat. No. 562,862 | Storer 1896 | No |
| U.S. Pat. No. 694,293 | Marshall 1902 | No |
| U.S. Pat. No. 713,603 | Churchward 1902 | No |
| U.S. Pat. No. 815,847 | Mallett 1906 | No |
| U.S. Pat. No. 901,440 | Hadley 1908 | No |
| U.S. Pat. No. 1,243,966 | Nichols 1917 | No |
| U.S. Pat. No. 1,465,251 | Broluska 1920 | No |
| U.S. Pat. No. 1,539,527 | Torrance et al 1925 | No |
| U.S. Pat. No. 17,756,672 | Barr 1930 | No |
| U.S. Pat. No. 2,408,080 | Lloyd 1946 | No |
| U.S. Pat. No. 2,409,600 | Trautschold 1946 | No |
| U.S. Pat. No. 2,845,554 | Schwab 1958 | No |
| U.S. Pat. No. 2,914,688 | Matthews 1959 | No |
| U.S. Pat. No. 3,084,269 | Sayers 1963 | No |
| U.S. Pat. No. 3,133,216 | Sayers 1964 | No |
| U.S. Pat. No. 3,185,877 | Sears 1965 | No |
| U.S. Pat. No. 3,270,228 | Rioux 1966 | No |
| U.S. Pat. No. 3,465,187 | Breaux 1969 | No |
| U.S. Pat. No. 3,488,533 | Pope 1970 | No |
| U.S. Pat. No. 3,594,596 | Eastham et al 1971 | No |
| U.S. Pat. No. 3,616,761 | Valls 1971 | No |
| U.S. Pat. No. 3,699,370 | Caldwell 1972 | No |
| U.S. Pat. No. 3,705,995 | Chabrerie et al 1972 | No |
| U.S. Pat. No. 3,736,450 | Emaldi 1973 | No |
| U.S. Pat. No. 3,944,865 | Jewitt 1976 | No |
| U.S. Pat. No. 3,989,969 | Lazaroiu et al 1976 | No |
| U.S. Pat. No. 4,021,690 | Burton 1977 | No |
| U.S. Pat. No. 4,097,758 | Jenkins 1978 | No |
| U.S. Pat. No. 4,321,499 | Gupta 1982 | No |
| U.S. Pat. No. 4,372,633 | Allen et al 1983 | No |
| U.S. Pat. No. 4,514,653 | Batni 1985 | No |
| U.S. Pat. No. 4,677,334 | Finegold et al 1987 | No |
| U.S. Pat. No. 4,691,133 | Mongeau 1987 | No |
| U.S. Pat. No. 4,866,321 | Blanchard et al 1989 | No |
| U.S. Pat. No. 5,451,825 | Strohm 1995 | No |
| U.S. Pat. No. 5,481,149 | Kambe et al 1996 | No |
| U.S. Pat. No. 5,514,923 | Gossler et al 1996 | No |
| U.S. Pat. No. 5,866,967 | Sasaki 1999 | No |
| U.S. Pat. No. 5,923,114 | Senni 1999 | No |
| U.S. Pat. No. 6,049,150 | Chudleigh 2000 | No |
| U.S. Pat. No. 6,495,941 | Nishimura 2002 | No |
| U.S. Pat. No. 6,603,233 | Strohm 2003 | No |
| U.S. Pat. No. 6,864,614 | Murray 2005 | No |
| U.S. Pat. No. 8,183,735 | Yanagisawa et al 2012 | No |
| U.S. Pat. No. 9,030,076 | Sato 2015 | No |
| U.S. Pat. No. 9,478,336 | Henning 2016 | No |

BRIEF DESCRIPTION OF THE DRAWINGS

| FIG.-1 | Dipole field of a Permanent Magnet |
| FIG.-2 | Exhibition of Magnetic induction of Faraday's Law |
| FIG.-3 | Faraday Disk |
| FIG.-4 | Shaft-Magnet Assembly with line from North to South inside permanent magnet at an angle with respect to shaft axis |
| FIG.-5 | Cross Sectional view of first embodiment of Shaft-Magnet Assembly |
| FIG.-6 | Shaft-Magnet Assembly with line from North to South inside permanent magnet being parallel to shaft axis |
| FIG.-7 | Cross Sectional view of second embodiment of Shaft-Magnet Assembly |
| FIG.-8 | Shaft-Magnet Assembly with line from North to South inside permanent magnet being perpendicular to shaft axis |
| FIG.-9 | Shaft-Magnet Assembly with line from North to South inside permanent magnet being perpendicular to shaft axis, further including a multiplicity of permanent mounted on said shaft wherein each magnet has alternating polarity |
| FIG.-10 | Cross Sectional view of third embodiment of Shaft-Magnet Assembly |
| FIG.-11 | A First Shaft-Coil Assembly wherein Permanent is stationary and said Shaft - Coil assembly spins |
| FIG.-12 | Cross Sectional view of said First Shaft-Coil assembly |
| FIG.-13 | A second Shaft-Coil Assembly wherein Permanent is stationary and said Shaft - Coil assembly spins wherein said coil further includes a conducting core |
| FIG.-14 | A cross sectional view of said first Shaft Coil-Assembly showing the placement of induced fields and forces |
| FIG.-15 | A cross sectional view of said second Shaft Coil Assembly showing the placement of charge assemblies |

Figure 16:
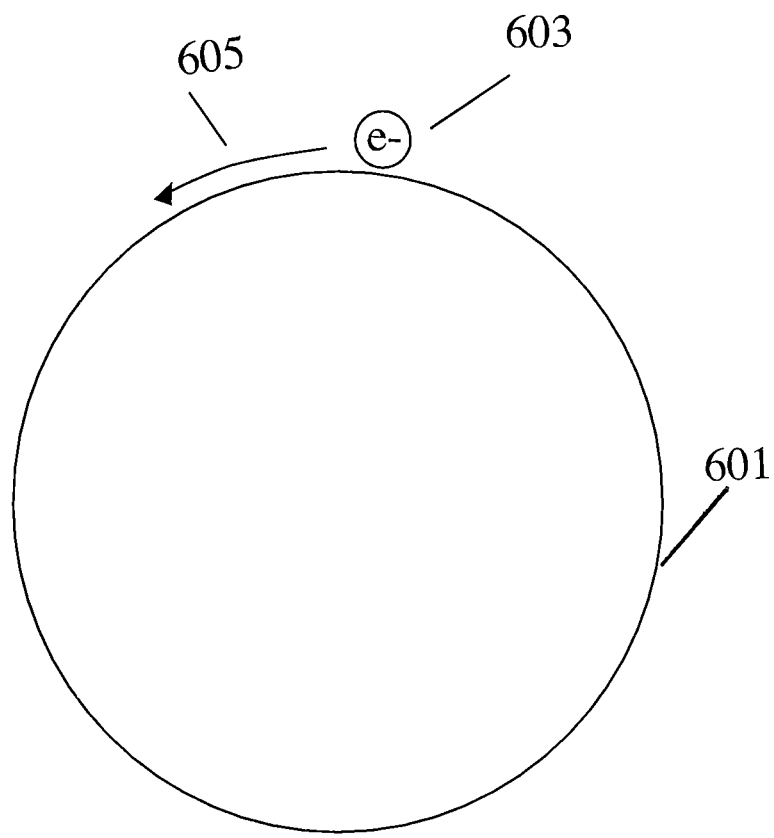

| | |
|---|---|
| FIG.-16 | A cross sectional view of said second Shaft Coil Assembly showing electron flow |

DETAILED DESCRIPTION OF THE INVENTION

Figure 1:
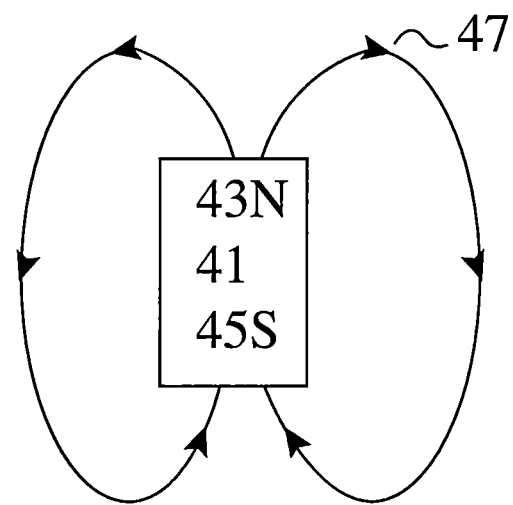
Figure 2:
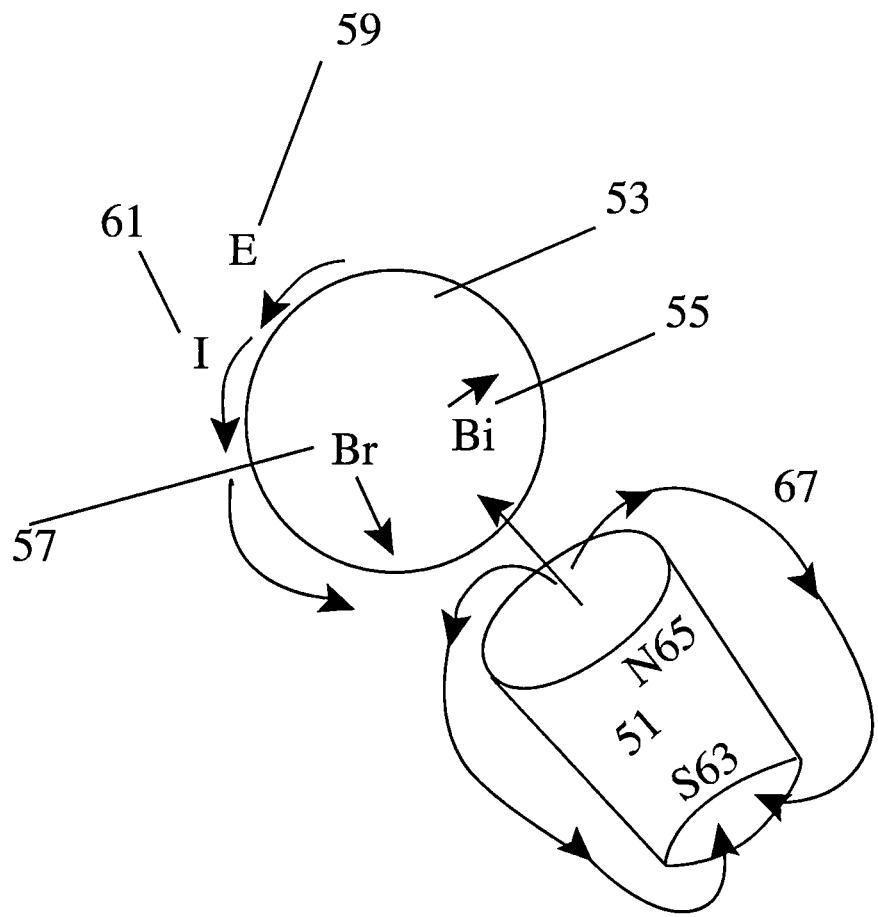
Figure 3:
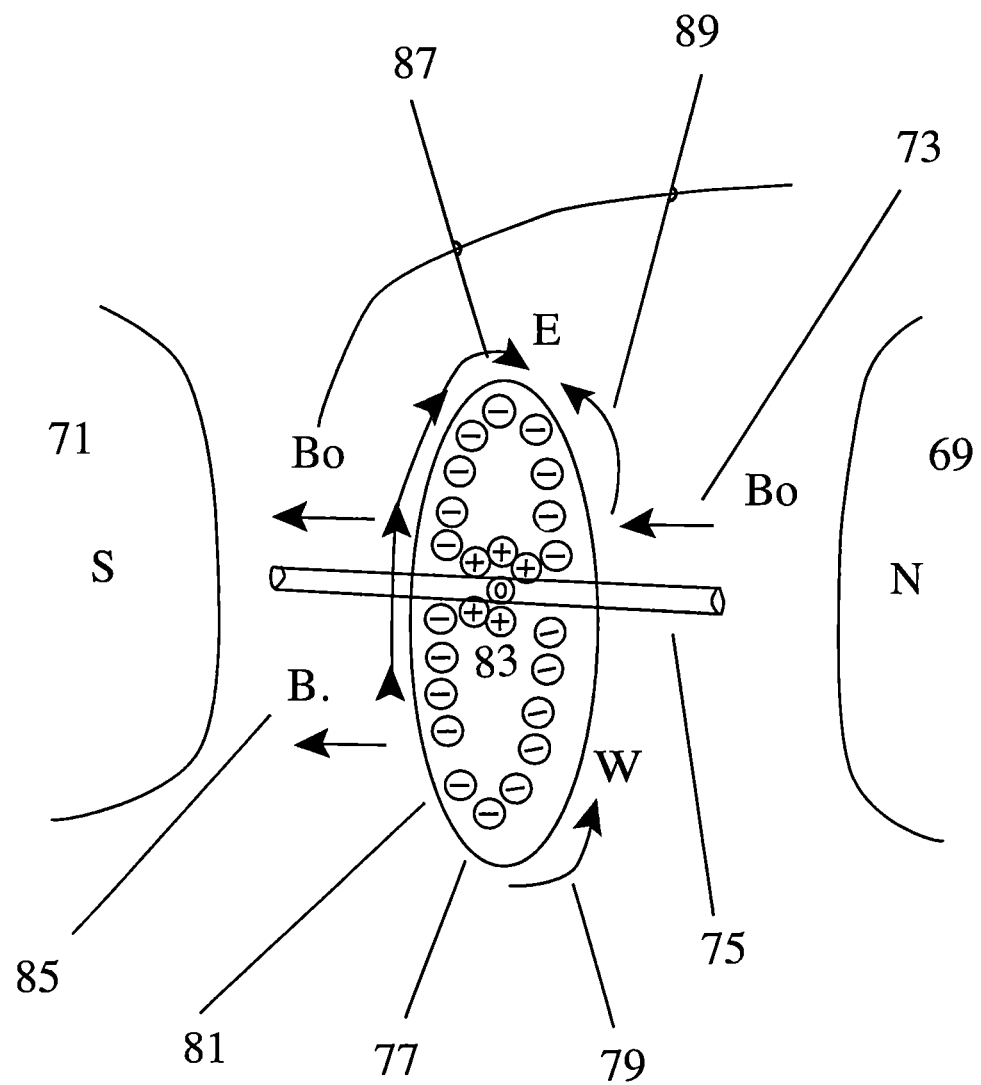
Figure 4:
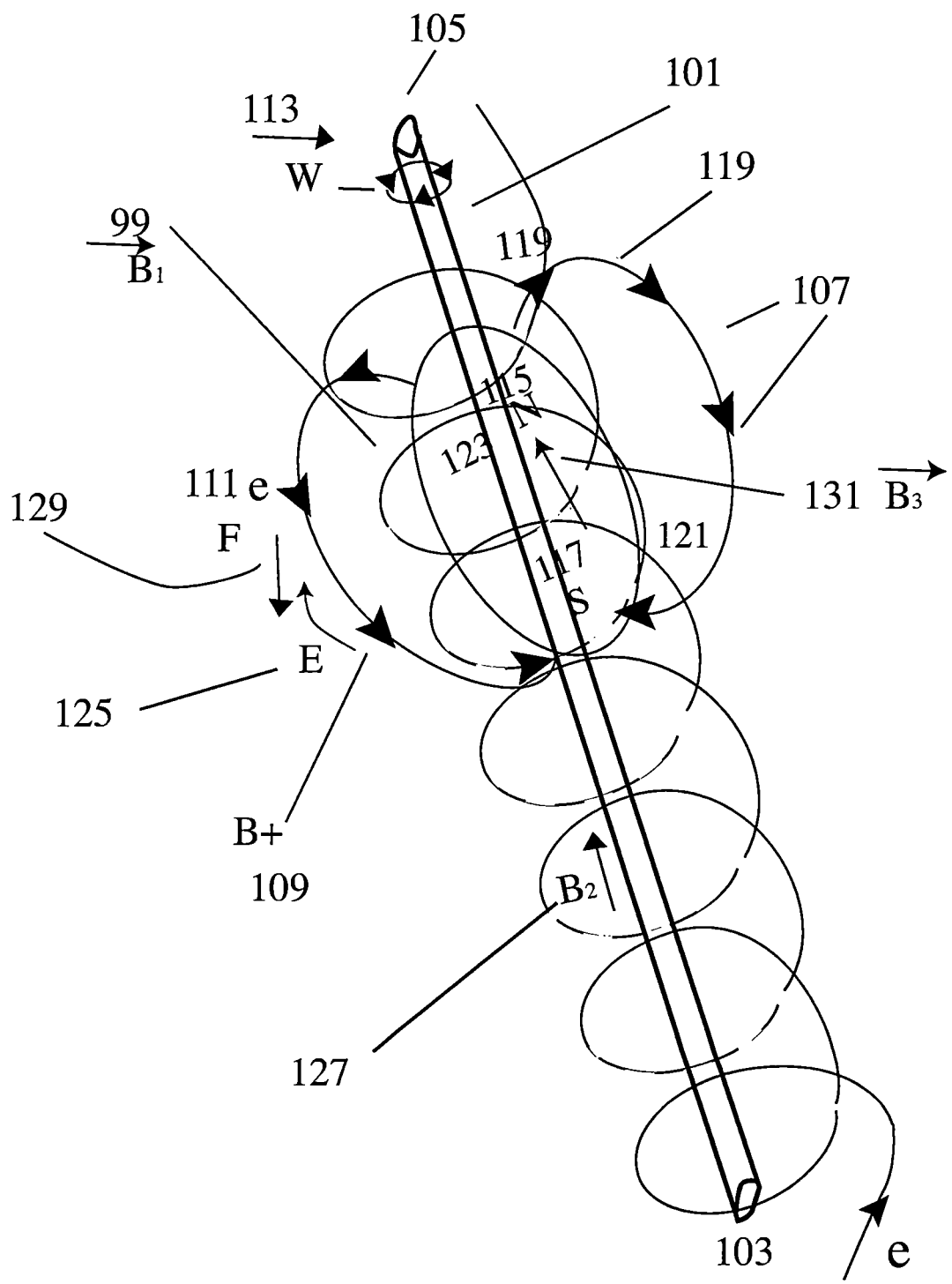
Figure 5:
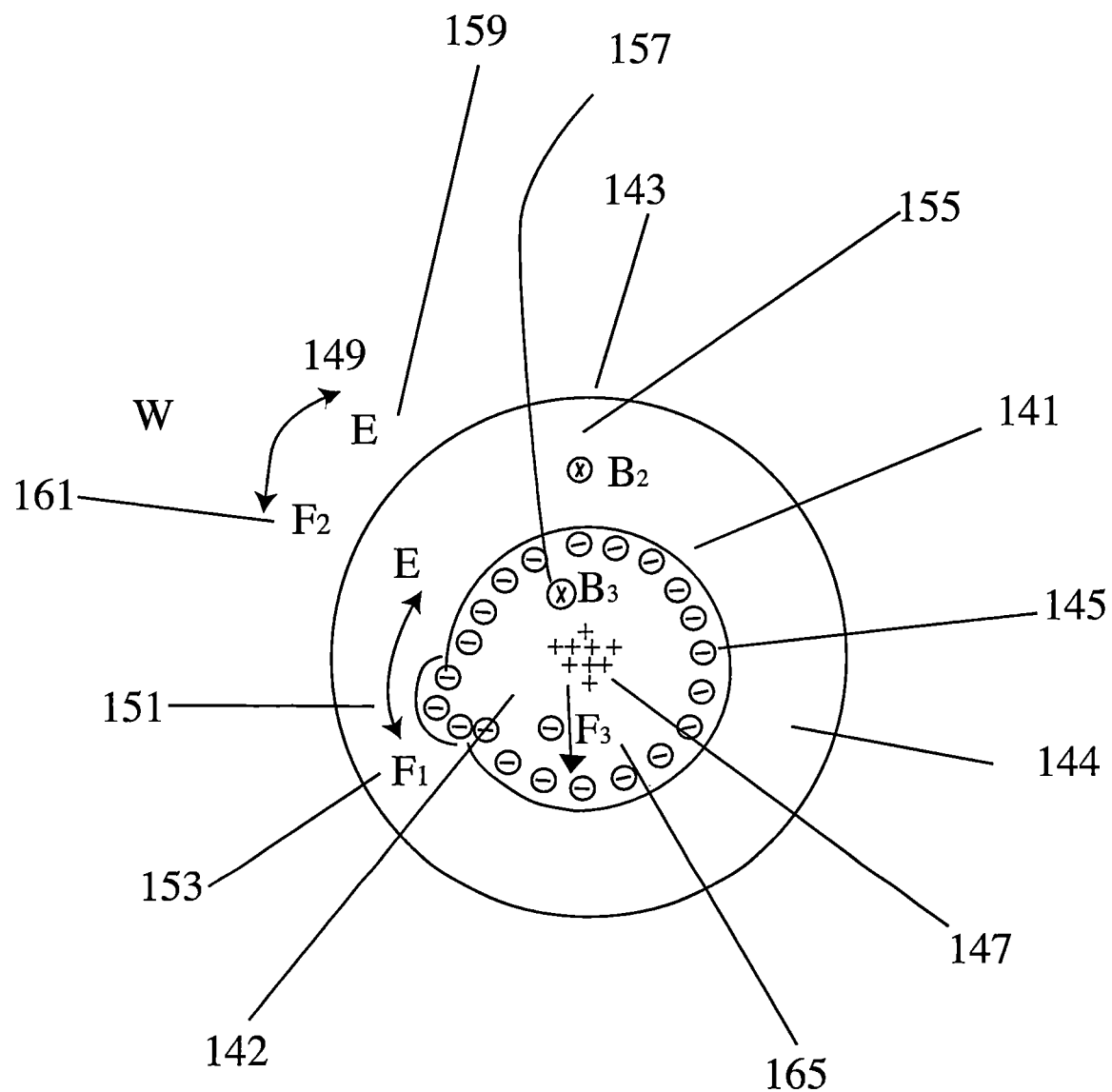

Referring to FIG. 4 what is shown are the basic embodiments of the simplest version of the proposed invention. It comprises a shaft 101 having a first end 103 and a second end 105. Said shaft having a permanent magnet 123 mounted thereon. Said permanent magnet having a north pole 115 and a south pole 117. Said permanent magnet being the source of a first magnet field $B_1$ 99. Said first magnetic field being the portion of the dipole field of said permanent magnet which is exterior to the physical boundary of said permanent magnet. Surrounding said magnet mounted on said shaft is at least one wire turn 107 around said magnet shaft system. Included in FIG. 4 are a multiplicity of wire windings. Further included is a means of mechanically spinning said shaft to give it an angular frequency ω 113. In FIG. 4 when looking from said first end of said shaft 103 towards said second end of said shaft 105 the shaft is spinning in a counter-clockwise direction. Again, the magnetic field due to said permanent magnet 123 which is external to the physical volume of said permanent magnet is the magnetic field 99. Said permanent magnet having a portion of its magnetic field 119 which emanates from said magnet at its north pole 115 and a portion of its magnetic field 121 enters said magnet at its south pole 117. The magnetic field external to said permanent magnet and due to said permanent magnet has a portion of it that is perpendicular to the path of said wire turn. This perpendicular portion is shown as 109 in FIG. 4. As said shaft is spinning this perpendicular portion 109 of said magnetic field of said permanent magnet exerts a Lorentz force on electrons in said wire. The wire is a conductive path and is chosen to be made of a material that has an electrical conductivity wherein the charge carrier giving it its electrical conductivity is the negatively charged electrons in the material and the positive charge in said material for the most part cannot move for the nuclei are bound to the solid state lattice within the material. Thus, the material out of which said wire is composed must not have positive charge carriers such as positive ions or even holes as exist in semiconductors. Said Lorentz force gives electrons in said wire a motion with the same directional sense as said spinning shaft. This means that in this example of FIG. 4 if one looks in a direction from said first end 103 of said shaft towards said second end 105 of said shaft said electrons will be caused to move in a counter-clockwise direction. Since said motion of said electrons is due to the Lorentz force due to said perpendicular portion of said first magnetic field no work is done to give the electrons this motion because the Lorentz force does not do any work in deflecting the electrons. This is known to those skilled in the art of electromagnetism. It is because the differential element of work δw done by the Lorentz force is equal to $\delta w = (q \vec{v} \times \vec{B}) \cdot \delta \vec{r} = 0$. In this equation $\vec{v}$ is the velocity of the particle, q is the charge of the particle, and $\vec{B}$ is the magnetic field. Since we know $$\vec{v} = \frac{\delta \vec{r}}{\delta T}$$

it means $\vec{v}$ is parallel to $\delta \vec{r}$. Therefore since $(q\vec{v} \times \vec{B})$ is perpendicular to $\vec{v}$ it is also perpendicular to $\delta \vec{r}$ and so $(q \vec{v} \times \vec{B}) \cdot \delta \vec{r} = 0$ This last statement being true because the dot product of two perpendicular vectors is zero. So, while work must be done to give the shaft its mechanical motion, no work is done by said magnetic field to give the electrons their motion in the winding of wire. This feature makes the proposed invention more efficient than previous electric generators. This is a novel feature of the proposed invention. Electrons are initially given motion due to the Lorentz force and not due to Faraday's law. Again, now referring to FIG. 4 as we look from the first end 103 of said shaft towards the second end 105 of said shaft the motion of said electrons in said wire is counter-clockwise indicated by the vector 111 $\vec{e}$ which is tangent to the path of said wire. The motion of said electrons creates a second magnetic field $B_2$ 127. Said second magnetic field being generated by Ampere's law because of the motion of said electrons and said second magnetic field is parallel to said shaft and in the volume within said windings and said second magnetic field is in a direction from said first end of said shaft 103 towards said second end of said shaft 105. At this point it is important to identify a third magnetic field which is actually a portion of the dipole field of said permanent magnet. We give it a separate label because the magnetic flux through the area defined by said wire turn 107 will have a unique sign and magnitude that will provide a critical condition for optimum function of the proposed invention. The magnetic field due to said permanent magnet 123 is a dipole field and in the physical matter of said permanent magnet it is in a direction from said south end 117 of said permanent magnet to the north end 115 of said permanent magnet. In those skilled in the art of Physics the magnetic field in the physical matter of a permanent magnet is just simply a portion of the dipole field of said permanent magnet. It being known that there are no magnetic monopoles and so all magnetic field lines form closed loops. For the purposes of explaining the operation and novelty of this mode of said proposed invention it is helpful to give the magnetic field in the physical matter of said permanent magnet its own label and identity. To that end referring to FIG. 4 we identify the magnetic field in the physical matter of said permanent magnet which is due to the permanent magnetism in the material as $B_3$ 131 and refer to it in our language as a third magnetic field. The magnetic dipole field due to said permanent magnetic field being the sum of said first magnetic field 99 $B_1$ and said third magnetic field 131 $B_3$. Now we define the magnetic flux through the area defined by the path of said wire loop 107 to be positive if the magnetic field is in a direction from the first end of said shaft 103 towards the second end of said shaft 105. This is necessary to distinguish such a flux from the flux through the area defined by the path of said wire loop 107 due to a magnetic field in a direction from the second of said shaft 105 towards the first end of said shaft 103 which would be a negative flux. In order for the invention to operate at optimum conditions the flux through the area defined by the path of said wire loop 107 due to said third magnetic field $B_3$ 131 must have an absolute value bigger than the flux through the area defined by the path of said wire loop 107 due to said first magnetic field $B_1$ 99. Equivalently with the sign of the positive and negative flux as defined this critical condition could be stated as the magnetic flux through the area defined by the path of said wire loop 107 must be positive. This critical condition is easily achieved by ensuring that the physical volume said permanent magnet is more than fifty percent of the physical volume comprised of the region inside the multiplicity of windings around said shaft magnet assembly. Another way to establish a quantification of this critical condition is to imagine looking along the shaft assembly in FIG. 4 from the vantage point of the first end of said shaft 103 towards the second of said shaft 105. This view is shown in FIG. 5. Referring to FIG. 5 what is shown is the cross-section of said permanent magnet 141 and the cross section of said wire loop 143. Also shown in FIG. 5 is the cross-sectional area within the outer boundary of said permanent magnet 142 and the cross sectional area within the boundary of said wire loop 143. The critical condition for the optimum conditions for the proposed invention can be stated that the minimum cross-sectional area of said permanent magnet needs to be at least fifty percent of the cross-sectional area defined by the boundary of said wire loop. Preferably if the cross-sectional area of said permanent magnet is a circle and the cross-sectional area of said wire loop is also a circle, the permanent magnet should be as close as possible to said wire loop without touching it. It cannot be too close because vibration and wobble in the shaft could cause the magnet to bang into the wire loop while the shaft is spinning and that would cause the system to fail.

Now the next novel unobvious feature of the proposed invention can be illustrated. Referring to FIG. 4 the magnetic flux through said wire winding 107 due to said second magnetic field $B_2$ will decrease with time as said spinning shaft begins to slow down due to friction. The decreasing with time of said magnetic flux due to $B_2$ will cause an electric field E 125 to be created in space by way of Faraday's law. Said electric field E 125 will exert a force F 129 on said electrons moving in said wire 111. Since the force F 129 exerted on said electrons 111 is exerted in the same direction they are already moving Faraday's law of induction is fighting to keep the current going instead of serving as an agent slow it down. This feature is absent in the electric generators of the prior art. This is positive electromagnetic feedback.

Another novel feature of the proposed invention is electro-mechanical in nature and is illustrated as we explain the additional features in FIG. 5. Referring to FIG. 5 what is shown is said permanent magnet 141 and the cross-sectional area defined as the area within the boundary line of 141 of said permanent magnet which is the area 142. Also shown in FIG. 5 is said wire loop 143 and the cross-sectional area defined as the total area within the boundary line of 143 which is the area 144. It is important to recognize that the area 144 includes within it the area 142. Remember that FIG. 5 is the view as shown from the point of view looking from said first end of said shaft 103 towards said second end of said shaft 105 wherein 103 and 105 are defined as in FIG. 4. In this view the shaft is spinning counterclockwise as indicated by (149. Now the magnetic field inside the area defined by the wire loop 143 in FIG. 5 is in a direction into the page and is indicated by the tail symbols of the arrows 155 and 157. The tail of an arrow is indicated by an X with a circle surrounding it as shown in FIG. 5. The tail of the arrow facing out of the page indicates that the tip of the arrow is pointing into the page. This is a standard use of symbols in all textbooks on Electro-Magnetism. The tail of the arrow 155 is $B_2$ which is caused by the counterclockwise circulation of electrons around the wire loop 143 due to Ampere's Law. The tail of the arrow 157 is the portion of $B_3$ which is perpendicular to the page $B_3$ being the field inside the body of said permanent magnet. Now the directions of these fields being established it is clear that the magnetic flux through the area 144 defined by the boundary of said wire loop 143 is into the page and the magnetic flux through the area 142 defined by the boundary of said permanent magnet 141 is also into the page. The next fact is that as the spinning of said shaft begins to slow down due to friction the counterclockwise flow of electrons in said wire loop 143 will decrease and the magnetic flux into page through the area 144 defined by the boundary of said wire loop 143 will also be decreasing with time. This will cause Faraday's Law to produce the electric fields 151 and 159. These electric fields provide an unobvious function that will help keep the turbine spinning and keep it from slowing down. To see this function, we must look at the internal structure of said permanent magnet 141. It is important that the permanent magnet be composed out of a material that along with being a permanent magnet is also a material that is an electrical conductor wherein the charge carrier is the negatively charged electrons within the material. Because of the counterclockwise spinning 149 of said permanent magnet 141 each electron within said permanent magnet has a velocity because it is in the rotating frame of said magnet and will experience a Lorentz force $F_3$ 165 that will push the electrons to the outer edge 145 of said permanent magnet. This electron migration due to the Lorentz force causes a collection of electrons 145 to gather at the outer edge of said permanent magnet 141 as long as said shaft is spinning. These electrons gathered at the outer edge will experience a force $F_1$ 153 which exerts a mechanical torque on said permanent magnet which serves to keep the shaft spinning. This is an unobvious novelty. It should also be noted that as the electrons migrate to the outer edge of said permanent magnet the region at the center of said permanent magnet closest to said shaft is left positively charged and this collection of positive charge is shown as 147 in FIG. 5. These positive charges 147 also experience a force that exerts a mechanical torque on said spinning shaft that serves to slow the shaft down but this torque is much smaller than the torque due to the force on electrons at the outer edge 145 because the electrons at the outer edge 145 are at a greater radial distance from the center of said spinning shaft than said positive charge 147 and as is known the torque is proportional to this radial distance from the center of said spinning shaft. Also, the induced electric fields 151 and 159 are larger as you move farther away from the axis of said shaft. It is important that said spinning shaft does not serve as an electrical leak to said permanent magnet. This brings us to impose the critical condition that said spinning shaft be composed of a material that is a non-conductor. That means said shaft is composed out of a material that is an electrical insulator.

The earlier novelty described in FIG. 4 can be seen in FIG. 5 as well. As the spinning shaft slows down due to friction Faraday's Law as stated also creates the electric field 159 which exerts a force $F_2$ 161 on electrons in said wire loop. As these electrons are depleted by pulling electrical potential energy out of said wire loop the counterclockwise electron motion in said wire loop is regenerated by the force $F_2$ 161 due to said electric field 159. Another way of saying this is that the electric field 159 exerts a force 161 on said electrons in a direction they are already moving. Therefore, this is positive electro-magnetic feedback.

Another important unobvious novelty of the proposed invention is that wire the loop develops a DC voltage by the action of the invention and as this electric energy is harvested to be used to charge batteries or whatever the use may be said wire loop or multiplicity of wire loops will have a zero output impedance and will thus have a high efficiency at transferring said electric energy.

In the example given in FIG. 4 and FIG. 5 it should be noted that spinning the shaft clockwise will result in the reduced performance because the novel influences which act to keep the shaft spinning as it begins to slow down will be downgraded.

The version of the invention shown in FIG. 4 and FIG. 5 is a Homopolar DC electric generator with positive electromagnetic and electro-mechanical feedback.

Figure 6:
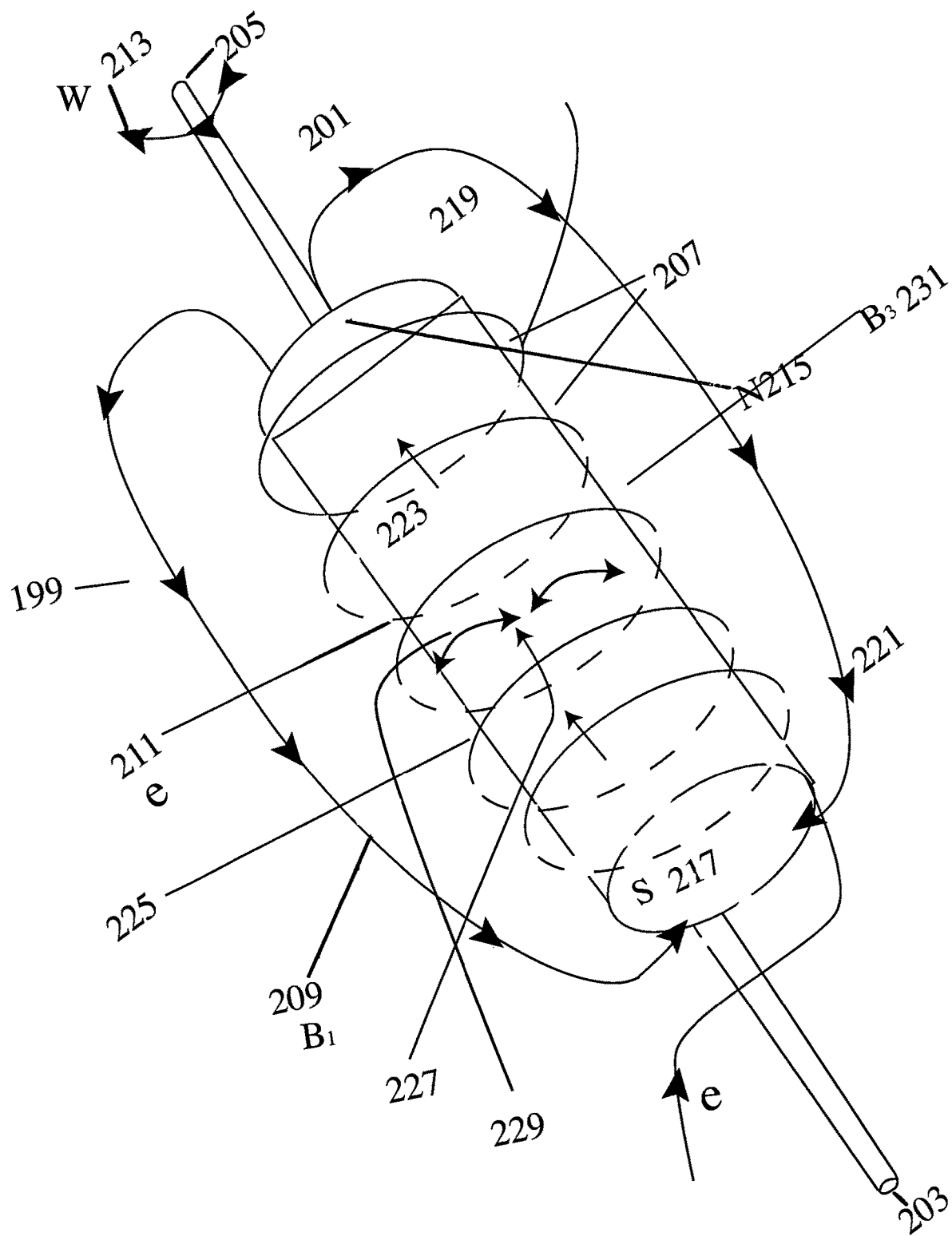

Referring to FIG. 6 what is shown are the basic embodiments of a more optimum version of the proposed invention. It comprises a shaft 201 having a first end 203 and a second end 205. Said shaft having a cylindrical permanent magnet 223 mounted thereon. Said cylindrical permanent magnet having a north pole 215 and a south pole 217. Said cylindrical permanent magnet being the source of a first magnet field $B_1$ 199. Said first magnetic field being the portion of the dipole field of said cylindrical permanent magnet which is exterior to the physical boundary of said cylindrical permanent magnet. The axis of said cylindrical permanent magnet being parallel to the axis of said shaft. Surrounding said magnet mounted on said shaft is at least one wire turn 207 around said magnet shaft system. Included in FIG. 6 are a multiplicity of wire windings. Further included is a means of mechanically spinning said shaft to give it an angular frequency ω 213. In FIG. 6 when looking from said first end of said shaft 203 towards said second end of said shaft 205 the shaft is spinning in a counter-clockwise direction.

Figure 7:
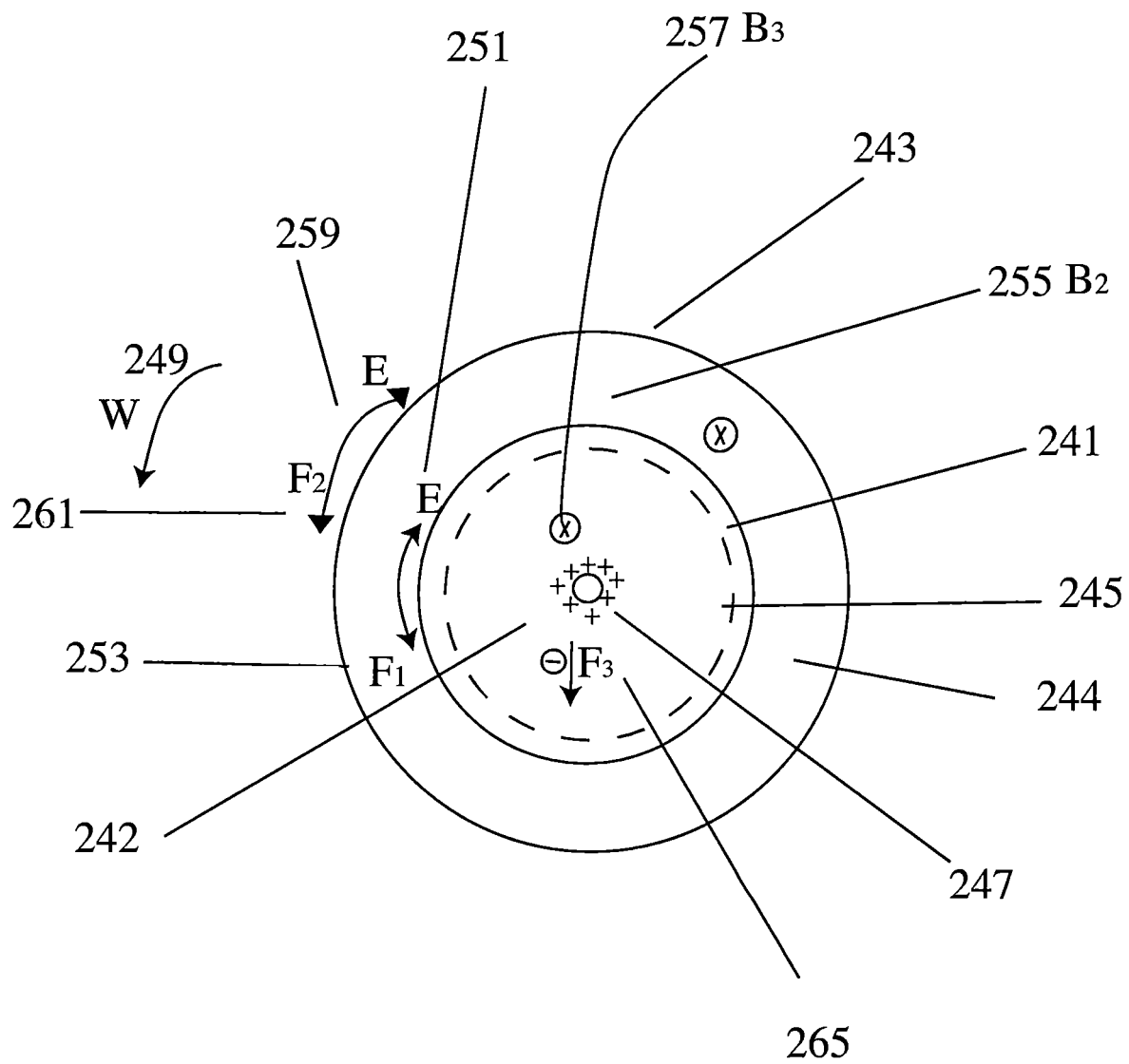

Again, the magnetic field due to said permanent magnet 223 which is external to the physical volume of said permanent magnet is the magnetic field 199. Said permanent magnet having a portion of its magnetic field 219 which emanates from said magnet at its north pole 215 and a portion of its magnetic field 221 enters said magnet at its south pole 217. The magnetic field external to said permanent magnet and due to said permanent magnet has a portion of it that is perpendicular to the path of said wire turn. This perpendicular portion is shown as 209 in FIG. 4. As shaft spins, this perpendicular portion 209 of said magnetic field of said permanent magnet exerts a Lorentz force on electrons in said wire. The wire is chosen to be made of a material that has an electrical conductivity wherein the charge carrier giving it its conductivity is the negatively charged electrons in the material and the positive charge in said material for the most part cannot move for the nuclei are bound to the solid state lattice within the material. Thus, the material out of which said wire is composed must not have positive charge carriers such as positive ions or even holes as exist in semiconductors. Said Lorentz force gives electrons in said wire motion with the same directional sense as said spinning shaft. This means that in this example of FIG. 6 if one looks in a direction from said first end 203 of said shaft towards said second end 205 of said shaft said electrons will be caused to move in a counterclockwise direction. Since said motion of said electrons is due to the Lorentz force due to said perpendicular portion of said first magnetic field no work is done to give the electrons this motion because the Lorentz force does not do any work in deflecting the electrons. This is known to those skilled in the art of electromagnetism. It is because the differential element of work δw done by the Lorentz force is equal to $\delta w = (q\vec{v} \times \vec{B}) \cdot \delta = 0$. In this equation $\vec{v}$ is the velocity of the particle, q is the charge of the particle, and $\vec{B}$ is the magnetic field. Since we know $$\vec{v} = \frac{\delta \vec{r}}{\delta T}$$

it means $\vec{v}$ is parallel to $\delta \vec{r}$. Therefore since $(q\vec{v} \times \vec{B})$ is perpendicular to $\vec{v}$ it is also perpendicular to $\delta \vec{r}$ and so $(q\vec{v} \times \vec{B}) \cdot \delta \vec{r} = 0$. This last statement being true because the dot product of two perpendicular vectors is zero. So, while work must be done to give the shaft its mechanical motion, no work is done by said magnetic field to give the electrons their motion in the winding of wire. This feature makes the proposed invention more efficient than previous electric generators. This is a novel feature of the proposed invention. Electrons are given motion due to the Lorentz force and not due to Faraday's law. Again, now referring to FIG. 6 as we look from the first end 203 of said shaft towards the second end 205 of said shaft the motion of said electrons in said wire is counterclockwise indicated by the vector 211 $\vec{e}$ which is tangent to the path of said wire. The motion of said electrons creates a second magnetic field $B_2$ 227. Said second magnetic field being generated by Ampere's law because of the motion of said electrons and said second magnetic field is parallel to said shaft and in the volume within said windings and said second magnetic field is in a direction from said first end of said shaft 203 towards said second end of said shaft 205. At this point it is important to identify a third magnetic field which is actually a portion the dipole field of said cylindrical permanent magnet. We give it a separate label because the magnetic flux through the area defined by said wire turn 207 will have a unique sign and magnitude that will provide a critical condition for optimum function of the proposed invention. The magnetic field due to said cylindrical permanent magnet 223 is a dipole field and in the physical matter of said cylindrical permanent magnet it is in a direction from said south end 217 of said cylindrical permanent magnet to the north end 215 of said cylindrical permanent magnet. In those skilled in the art of Physics the magnetic field in the physical matter of a permanent magnet is just simply a portion of the dipole field of said permanent magnet. It being known that there are no magnetic monopoles and so all magnetic field lines form closed loops. For the purposes of explaining the operation and novelty of said proposed invention it is helpful to give the magnetic field in the physical matter of said cylindrical permanent magnet its own label and identity. To that end referring to FIG. 6 we identify the magnetic field in the physical matter of said cylindrical permanent magnet which is due to the permanent magnetism in the material as $B_3$ 231 and refer to it in our language as a third magnetic field. The magnetic dipole field due to said permanent magnetic field being the sum of said first magnetic field 199 $B_1$ and said third magnetic field 231 $B_3$. Now we define the magnetic flux through the area defined by the path of said wire loop 207 to be positive if the magnetic field is in a direction from the first end of said shaft 203 towards the second end of said shaft 205. This is necessary to distinguish such a flux from the flux through the area defined by the path of said wire loop 207 due to a magnetic field in a direction from the second end of said shaft 205 towards the first end of said shaft 203 which would be a negative flux. In order for the invention to operate at optimum conditions the flux through the area defined by the path of said wire loop 207 due to said third magnetic field $B_3$ 231 must have an absolute value bigger than the flux through the area defined by the path of said wire loop 207 due to said first magnetic field $B_1$ 199. Equivalently with the sign of the positive and negative flux as defined this critical condition could be stated as the magnetic flux through the area defined by the path of said wire loop 207 must be positive. This critical condition is easily achieved by ensuring that the physical volume said permanent magnet is more than fifty percent of the physical volume comprised of the region inside the multiplicity of windings around said shaft magnet assembly. Another way to establish a quantification of this critical condition is to imagine looking along the shaft assembly in FIG. 6 from the vantage point of the first end of said shaft 203. This view is shown in FIG. 7. Referring to FIG. 7 what is shown is the cross-section of said permanent magnet 241 and said wire loop 243. Also shown in FIG. 7 is the cross-sectional area within the outer boundary of said permanent magnet 242 and the cross-sectional area within the boundary of said wire loop 243. The critical condition for the optimum conditions for the proposed invention can be stated that the minimum cross-sectional area of said permanent magnet needs to be at least fifty percent of the cross-sectional area defined by said wire loop. Preferably if the cross-sectional area of said permanent magnet is a circle and the cross-sectional area of said wire loop is also a circle, the permanent magnet should be as close as possible to said wire loop without touching it. It cannot be too close because vibration and wobble in the shaft could cause the magnet to bang into the wire loop while the shaft is spinning and that would cause the system to fail.

Now the next novel unobvious feature of the proposed invention can be illustrated. Referring to FIG. 6 the magnetic flux through said wire winding 207 due to said second magnetic field $B_2$ will decrease with time as said spinning shaft begins to slow down due to friction. The decreasing with time of said magnetic flux due to $B_2$ will cause an electric field E 225 to be created in space by way of Faraday's law. Said electric field E 225 will exert a force F 229 on said electrons moving in said wire 211. Since the force F 229 exerted on said electrons 211 is exerted in the same direction they are already moving Faraday's law of induction is fighting to keep the current going instead of serving as an agent slow it down. This is positive Electromagnetic feedback. This feature is absent in the prior art.

Another novel feature of the proposed invention is electro-mechanical in nature and is absent in most of the prior art and is illustrated as we explain the additional features in FIG. 7. Referring to FIG. 7 what is shown is said permanent magnet 241 and the cross-sectional area defined as the area within the boundary line of 241 of said permanent magnet which is the area 242. Also shown in FIG. 7 is said wire loop 243 and the cross-sectional area defined as the total area within the boundary line of 243 which is the area 244. It is important to recognize that the area 244 includes within it the area 242. Remember that FIG. 7 is the view as shown from the point of view looking from said first end of said shaft 203 towards said second end of said shaft 205 wherein 203 and 205 are defined as in FIG. 6. In this view the shaft is spinning counterclockwise as indicated by ω 249. Now the magnetic field inside the area defined by the boundary of said wire loop 243 in FIG. 7 is in a direction into the page and is indicated by the tail symbols of the arrows 255 and 257. The tail of an arrow is indicated by an X with a circle surrounding it as shown in FIG. 7. The tail of the arrow facing out of the page indicates that the tip of the arrow is pointing into the page. This is a standard use of symbols in all textbooks on Electro-Magnetism. The tail of the arrow 255 is $B_2$ which is caused by the counterclockwise circulation of electrons around the wire loop 243 due to Ampere's law. The tail of the arrow 257 is $B_3$ which is the field inside the body of said permanent magnet. Now in FIG. 7 the directions of these fields being established it is clear that the magnetic flux through the area 244 defined by the boundary of said wire loop 243 is into the page and the magnetic flux through the area 242 defined by the boundary of said cylindrical permanent magnet 241 is also into the page. The next fact is that as the spinning of said shaft begins to slow down due to friction the counterclockwise flow of electrons in said wire loop 243 will decrease and the magnetic flux into page through the area 244 defined by the boundary of said wire loop 243 will also be decreasing with time. This will cause Faraday's Law to produce the electric fields 251 and 259. These electric fields provide an unobvious function that will keep the turbine spinning and keep it from slowing down. To see this function, we must look at the internal structure of said permanent magnet 241. It is important that the cylindrical permanent magnet be composed out of a material that along with being a permanent magnet is also a material that is an electrical conductor wherein the charge carrier is the negatively charged electrons within the material. Because of the counterclockwise spinning 249 of said cylindrical permanent magnet 241 each electron within said cylindrical permanent magnet has a velocity because it is in the rotating frame of said shaft magnet and will experience a Lorentz force $F_3$ 265 that will push the electrons to the outer edge 245 of said cylindrical permanent magnet. This electron migration due to the Lorentz force causes a collection of electrons 245 to gather at the outer edge of said cylindrical permanent magnet 241 as long as said shaft is spinning. These electrons will experience a force $F_1$ 253 which exerts a mechanical torque on said cylindrical permanent magnet which serves to keep the shaft spinning. This is an unobvious novelty. It should also be noted that as the electrons migrate to the outer edge of said cylindrical permanent magnet the region at the center of said cylindrical permanent magnet is left positively charged and this collection of positive charge is shown as 247 in FIG. 7. These positive charges 247 also experience a force that exerts a mechanical torque on said spinning shaft that serves to slow the shaft down but this torque is much smaller than the torque due to the force on electrons at the outer edge 245 because the electrons at the outer edge 245 are at a greater radial distance from the center of said spinning shaft than said positive charge 247 and as is known the torque is proportional to this radial distance from the center of said spinning shaft. It is important that said spinning shaft does not serve as an electrical leak to said permanent magnet. This brings us to impose the critical condition that said spinning shaft be composed of a material that is a non-conductor. That means said shaft is composed out of a material that is an electrical insulator.

The earlier novelty described in FIG. 6 can be seen in FIG. 7 as well. As the spinning shaft slows down due to friction Faraday's Law as stated also creates the electric field 259 which exerts a force $F_2$ 261 on electrons in said wire loop. As these electrons are depleted by pulling electrical potential energy out of said wire loop the counterclockwise electron motion in said wire loop is regenerated by the force $F_2$ 261 due to said electric field 259. Another way of saying this is that the electric field 259 exerts a force 261 on said electrons in a direction they are already moving. Therefore, this is positive electro-magnetic feedback in a Homopolar DC electric generator.

Another important unobvious novelty of the proposed invention is that wire the loop develops a DC voltage by the action of the invention and as this electric energy is harvested to be used to charge batteries or whatever the use may be said wire loop or multiplicity of wire loops will have a zero output impedance and will thus have a high efficiency at transferring said electric energy.

In the example given in FIG. 6 and FIG. 7 it should be noted that spinning the shaft clockwise will result in the reduced performance because the novel influences which act to keep the shaft spinning as it begins to slow down will be less effective. the positive electromagnetic and electro-mechanical feedback will be less effective if the initial mechanical motion imparted to the system is clockwise as viewed from the first end of said shaft towards the second end of said shaft.

The version of the invention shown in FIG. 6 and FIG. 7 is a Homopolar DC electric generator with positive electromagnetic and electro-mechanical feedback.

Figure 8:
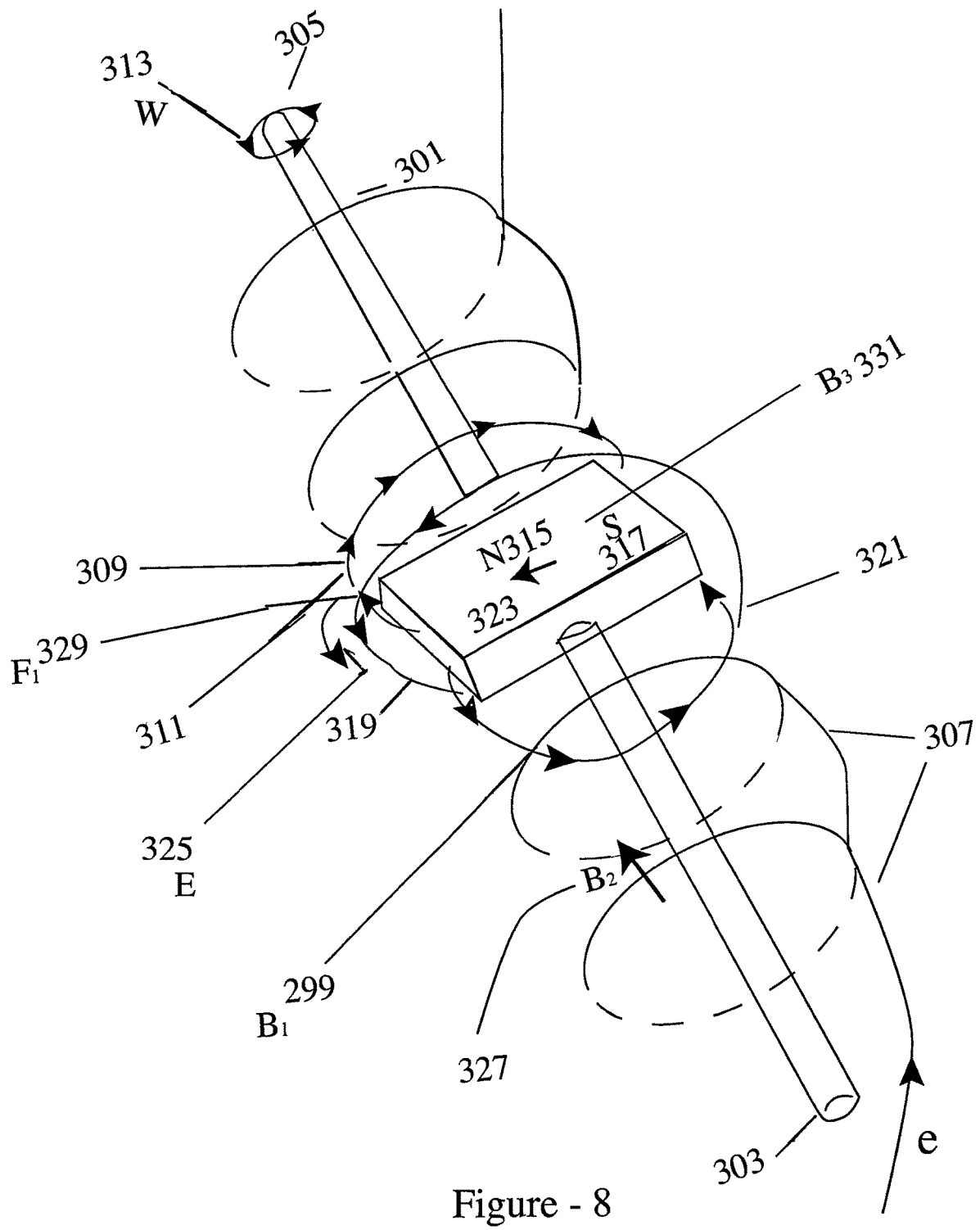

Referring to FIG. 8 what is shown are the basic embodiments of another version of the proposed invention. It comprises a shaft 301 having a first end 303 and a second end 305. Said shaft having a permanent magnet 323 mounted thereon. Said permanent magnet having a north pole 315 and a south pole 317. Said permanent magnet being the source of a first magnet field $B_1$ 299. Said first magnetic field being the portion of the dipole field of said permanent magnet which is exterior to the physical boundary of said permanent magnet. The geometric line extending from the south end of said permanent magnet to the north end of said permanent magnet being perpendicular to the axis of said shaft. Surrounding said magnet mounted on said shaft is at least one wire turn 307 around said magnet shaft system. Included in FIG. 8 are a multiplicity of wire windings. Further included is a means of mechanically spinning said shaft to give it an angular frequency $\omega$ 313. In FIG. 8 when looking from said first end of said shaft 303 towards said second end of said shaft 305 the shaft is spinning in a counter-clockwise direction.

Again, the magnetic field due to said permanent magnet 323 which is external to the physical volume of said permanent magnet is the magnetic field 299. Said permanent magnet having a portion of its magnetic field 319 which emanates from said magnet at its north pole 315 and a portion of its magnetic field 321 enters said magnet at its south pole 317. The magnetic field external to said permanent magnet and due to said permanent magnet has a portion of it that is perpendicular to the path of said wire turn. This perpendicular portion is shown as 309 in FIG. 8. As shaft spins, this perpendicular portion 309 of said magnetic field of said permanent magnet exerts a Lorentz force on electrons in said wire. The wire is chosen to be made of a material that has an electrical conductivity wherein the charge carrier giving it its conductivity is the negatively charged electrons in the material and the positive charge in said material for the most part cannot move for the nuclei are bound to the solid state lattice within the material. Thus, the material out of which said wire is composed must not have positive charge carriers such as positive ions or even holes as exist in semiconductors. Said Lorentz force gives electrons in said wire motion with the same directional sense as said spinning shaft. This means that in this example of FIG. 8 if one looks in a direction from said first end 303 of said shaft towards said second end 305 of said shaft said electrons will be caused to move in a counterclockwise direction. Since said motion of said electrons is due to the Lorentz force due to said perpendicular portion of said first magnetic field no work is done to give the electrons this motion because the Lorentz force does not do any work in deflecting the electrons. This is known to those skilled in the art of electromagnetism. It is because the differential element of work $\delta w$ done by the Lorentz force is equal to $\delta w = (q\vec{v} \times \vec{B}) \cdot \delta\vec{r} = 0$. In this equation $\vec{v}$ is the velocity of the particle, q is the charge of the particle, and $\vec{B}$ is the magnetic field. Since we know $$\vec{v} = \frac{\delta \vec{r}}{\delta T}$$

it means $\vec{v}$ is parallel to $\delta\vec{r}$. Therefore since $(q\vec{v} \times \vec{B})$ is perpendicular to $\vec{v}$ it is also perpendicular to $\delta\vec{r}$ and so $(q\vec{v} \times \vec{B}) \cdot \delta\vec{r} = 0$. This last statement being true because the dot product of two perpendicular vectors is zero. So, while work must be done to give the shaft its mechanical motion, no work is done by said magnetic field to give the electrons their motion in the winding of wire. This feature makes the proposed invention more efficient than previous electric generators. This is a novel feature of the proposed invention. Electrons are given motion due to the Lorentz force and not due to Faraday's law. Again, now referring to FIG. 8 as we look from the first end 303 of said shaft towards the second end 305 of said shaft the motion of said electrons in said wire is counterclockwise indicated by the vector 311 which is tangent to the path of said wire. The motion of said electrons creates a second magnetic field $B_2$ 327. Said second magnetic field being generated by Ampere's law because of the motion of said electrons and said second magnetic field is parallel to said shaft and in the volume within said windings and said second magnetic field is in a direction from said first end of said shaft 303 towards said second end of said shaft 305. At this point it is important to identify a third magnetic field which is actually a portion the dipole field of said permanent magnet. We give it a separate label because the magnetic flux through the area defined by said wire turn 307 will have a unique sign and magnitude that will provide a critical condition for optimum function of the proposed invention. The magnetic field due to said permanent magnet 323 is a dipole field and in the physical matter of said permanent magnet it is in a direction from said south end 317 of said permanent magnet to the north end 315 of said permanent magnet. This third magnetic field is perpendicular to the plane defined by the area of said wire loop and therefore does not contribute to the magnetic flux through the area of said wire loop. This will be recognized as a critical feature of this mode of the proposed invention as will become clear. In those skilled in the art of Physics the magnetic field in the physical matter of a permanent magnet is just simply a portion of the dipole field of said permanent magnet. It being known that there are no magnetic monopoles and so all magnetic field lines form closed loops. For the purposes of explaining the operation and novelty of said proposed invention it is helpful to give the magnetic field in the physical matter of said permanent magnet its own label and identity. To that end referring to FIG. 8 we identify the magnetic field in the physical matter of said cylindrical permanent magnet which is due to the permanent magnetism within said physical matter as $B_3$ 331 and refer to it in our language as a third magnetic field. The magnetic dipole field due to said permanent magnetic field being the sum of said first magnetic field 299 $B_1$ and said third magnetic field 331 $B_3$. Now we define the magnetic flux through the area defined by the path of said wire loop 307 to be positive if the magnetic field is in a direction from the first end of said shaft 303 towards the second end of said shaft 305. This is necessary to distinguish such a flux from the flux through the area defined by the path of said wire loop 307 due to a magnetic field in a direction from the second end of said shaft 305 towards the first end of said shaft 303 which would be a negative flux. In order for the invention to operate at optimum conditions in this mode the flux through the area defined by the path of said wire loop 307 due to said third magnetic field $B_3$ 331 must have a value close to zero. This will be assured because said third magnetic field $B_3$ 331 is perpendicular to the plane defined by said wire loop 307 along with the multiplicity of said wire loops shown in FIG. 8.

With the sign of the positive and negative flux as defined this critical condition could be stated as the magnetic flux through the area defined by the path of said wire loop 307 due to said field 331 $B_3$ must be neither positive nor negative. This critical condition is easily achieved by ensuring that $B_3$ is perpendicular to the plane of the area defined by said wire loop 307.

Figure 10:
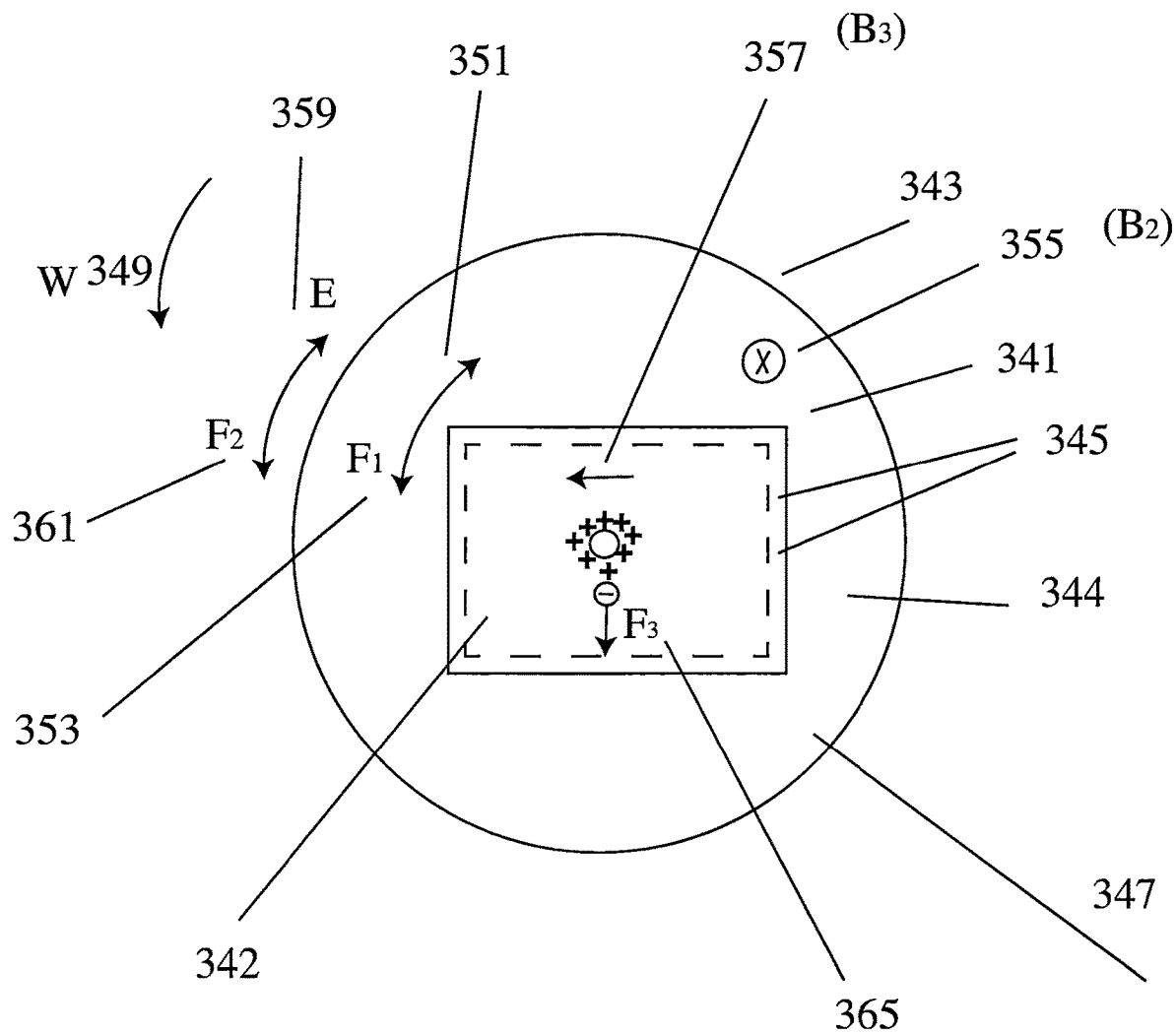

Another critical condition to make this mode of the invention work at optimum conditions is that cross sectional area of said permanent magnet should be as large as possible and still be within the area defined by said wire loop. If you imagine looking along the shaft assembly in FIG. 8 from the vantage point of the first end of said shaft 303. This view is shown in FIG. 10. Referring to FIG. 10 what is shown is the cross-section of said permanent magnet 341 and said wire loop 343. Also shown in FIG. 10 is the cross-sectional area within the outer boundary of said permanent magnet 342 and the cross-sectional area within the boundary of said wire loop 343. The critical condition for the optimum conditions for the proposed invention can be stated that the minimum cross-sectional area of said permanent magnet needs to be at least fifty percent of the cross-sectional area defined by said wire loop. Preferably if the cross-sectional area of said permanent magnet is a circle and the cross-sectional area of said wire loop is also a circle, the permanent magnet should be as close as possible to said wire loop without touching it. It cannot be too close because vibration and wobble in the shaft could cause the magnet to bang into the wire loop while the shaft is spinning and that would cause the system to fail.

Now the next novel unobvious feature of the proposed invention can be illustrated. Referring to FIG. 8 the magnetic flux through said wire winding 307 due to said second magnetic field $B_2$ will decrease with time as said spinning shaft begins to slow down due to friction. The decreasing with time of said magnetic flux due to $B_2$ will cause an electric field E 325 to be created in space by way of Faraday's law. Said electric field E 325 will exert a force F 329 on said electrons moving in said wire 311. Since the force F 329 exerted on said electrons 311 is exerted in the same direction they are already moving Faraday's law of induction is fighting to keep the current going instead of serving as an agent slow it down. This is positive electromagnetic feedback. This feature is absent in the prior art.

Another novel feature of the proposed invention is electro-mechanical in nature and is absent in most of the prior art and is illustrated as we explain the additional features in FIG. 10. Referring to FIG. 10 what is shown is said permanent magnet 341 and the cross-sectional area defined as the area within the boundary line of 341 of said permanent magnet which is the area 342. Also shown in FIG. 10 is said wire loop 343 and the cross-sectional area defined as the total area within the boundary line of 343 which is the area 344. It is important to recognize that the area 344 includes within it the area 342. Remember that FIG. 10 is the view as shown from the point of view looking from said first end of said shaft 303 towards said second end of said shaft 305 wherein 303 and 305 are defined as in FIG. 8. In this view the shaft is spinning counterclockwise as indicated by ω 349. Now the magnetic field inside the area defined by the boundary of said wire loop 343 in FIG. 10 is in a direction into the page and is indicated by the tail symbols of the arrows 355 and 357. The tail of an arrow is indicated by an X with a circle surrounding it as shown in FIG. 10. The tail of the arrow facing out of the page indicates that the tip of the arrow is pointing into the page. This is a standard use of symbols in all textbooks on Electro-Magnetism. The tail of the arrow 355 is $B_2$ which is caused by the counterclockwise circulation of electrons around the wire loop 343 due to Ampere's law. The tail of the arrow 357 is $B_3$ which is the field inside the body of said permanent magnet. Now in FIG. 8 the directions of these fields being established it is clear that the magnetic flux through the area 344 defined by the boundary of said wire loop 343 is into the page and the magnetic flux through the area 342 defined by the boundary of said cylindrical permanent magnet 341 is also into the page. The next fact is that as the spinning of said shaft begins to slow down due to friction the counterclockwise flow of electrons in said wire loop 343 will decrease and the magnetic flux into page through the area 344 defined by the boundary of said wire loop 343 will also be decreasing with time. This will cause Faraday's Law to produce the electric fields 351 and 359. These electric fields provide an unobvious function that will keep the turbine spinning and keep it from slowing down. To see this function, we must look at the internal structure of said permanent magnet 341. It is important that the cylindrical permanent magnet be composed out of a material that along with being a permanent magnet is also a material that is an electrical conductor wherein the charge carrier is the negatively charged electrons within the material. Because of the counterclockwise spinning 349 of said cylindrical permanent magnet 341 each electron within said cylindrical permanent magnet has a velocity because it is in the rotating frame of said magnet and will experience a Lorentz force $F_3$ 365 that will push the electrons to the outer edge 345 of said cylindrical permanent magnet. This electron migration due to the Lorentz force causes a collection of electrons 345 to gather at the outer edge of said cylindrical permanent magnet 341 as long as said shaft is spinning. These electrons will experience a force $F_1$ 353 which exerts a mechanical torque on said cylindrical permanent magnet which serves to keep the shaft spinning. This is an unobvious novelty. It should also be noted that as the electrons migrate to the outer edge of said cylindrical permanent magnet the region at the center of said cylindrical permanent magnet is left positively charged and this collection of positive charge is shown as 347 in FIG. 10. These positive charges 347 also experience a force that exerts a mechanical torque on said spinning shaft that serves to slow the shaft down but this torque is much smaller than the torque due to the force on electrons at the outer edge 345 because the electrons at the outer edge 345 are at a greater radial distance from the center of said spinning shaft than said positive charge 347 and as is known the torque is proportional to this radial distance from the center of said spinning shaft. It is important that said spinning shaft does not serve as an electrical leak to said permanent magnet. This brings us to impose the critical condition that said spinning shaft be composed of a material that is a non-conductor. That means said shaft is composed out of a material that is an electrical insulator.

The earlier novelty described in FIG. 8 can be seen in FIG. 10 as well. As the spinning shaft slows down due to friction Faraday's Law as stated also creates the electric field 359 which exerts a force $F_2$ 361 on electrons in said wire loop. As these electrons are depleted by pulling electrical potential energy out of said wire loop the counterclockwise electron motion in said wire loop is regenerated by the force $F_2$ 361 due to said electric field 359. Another way of saying this is that the electric field 359 exerts a force 361 on said electrons in a direction they are already moving. Therefore, this is positive electro-magnetic feedback.

Figure 9:
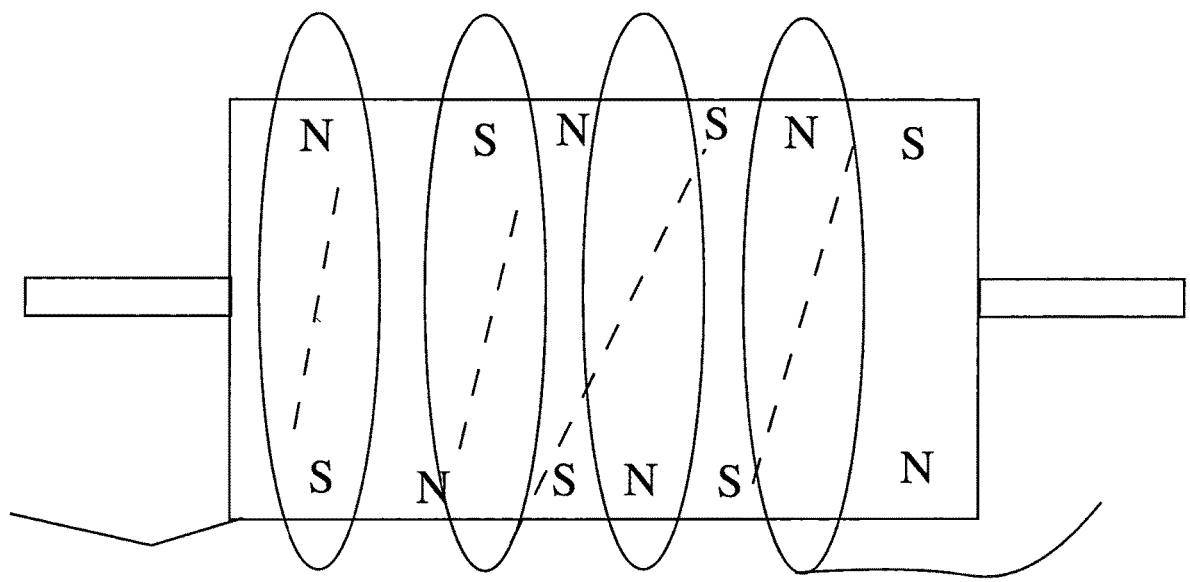

Another option for this version of the invention is to stack a multiplicity of permanent magnets on said shaft as shown in FIG. 9. Each magnet is stacked on said shaft making a shaft magnet assemble with a coil wound circumferentially as in the version shown in FIG. 8. The only difference is the shaft magnet system has a multiplicity of magnets stacked on the shaft wherein the north and south polarities are alternating as shown in FIG. 9. As this system spins it will cause electron flow as described in the version of FIG. 8. Each separate magnet in FIG. 9 will cause electrons to flow in said coil in the same directional sense as shaft-magnet system as it spins regardless of the orientation of each magnet. This may be unobvious to the layman.

Another important unobvious novelty of the proposed invention is that wire the loop develops a DC voltage by the action of the invention and as this electric energy is harvested to be used to charge batteries or whatever the use may be said wire loop or multiplicity of wire loops will have a zero output impedance and will thus have a high efficiency at transferring said electric energy.

In the example given in FIG. 8 and FIG. 10 it should be noted that spinning the shaft clockwise will result in no reduction of performance. This system can be spun both clockwise and counterclockwise and the positive electro-magnetic and electro-mechanical feedback will be functional in both directions.

The version of the invention shown in FIG. 8, FIG. 9 and FIG. 10 is a Homopolar DC electric generator with positive electro-magnetic and electro-mechanical feedback.

Figure 11:
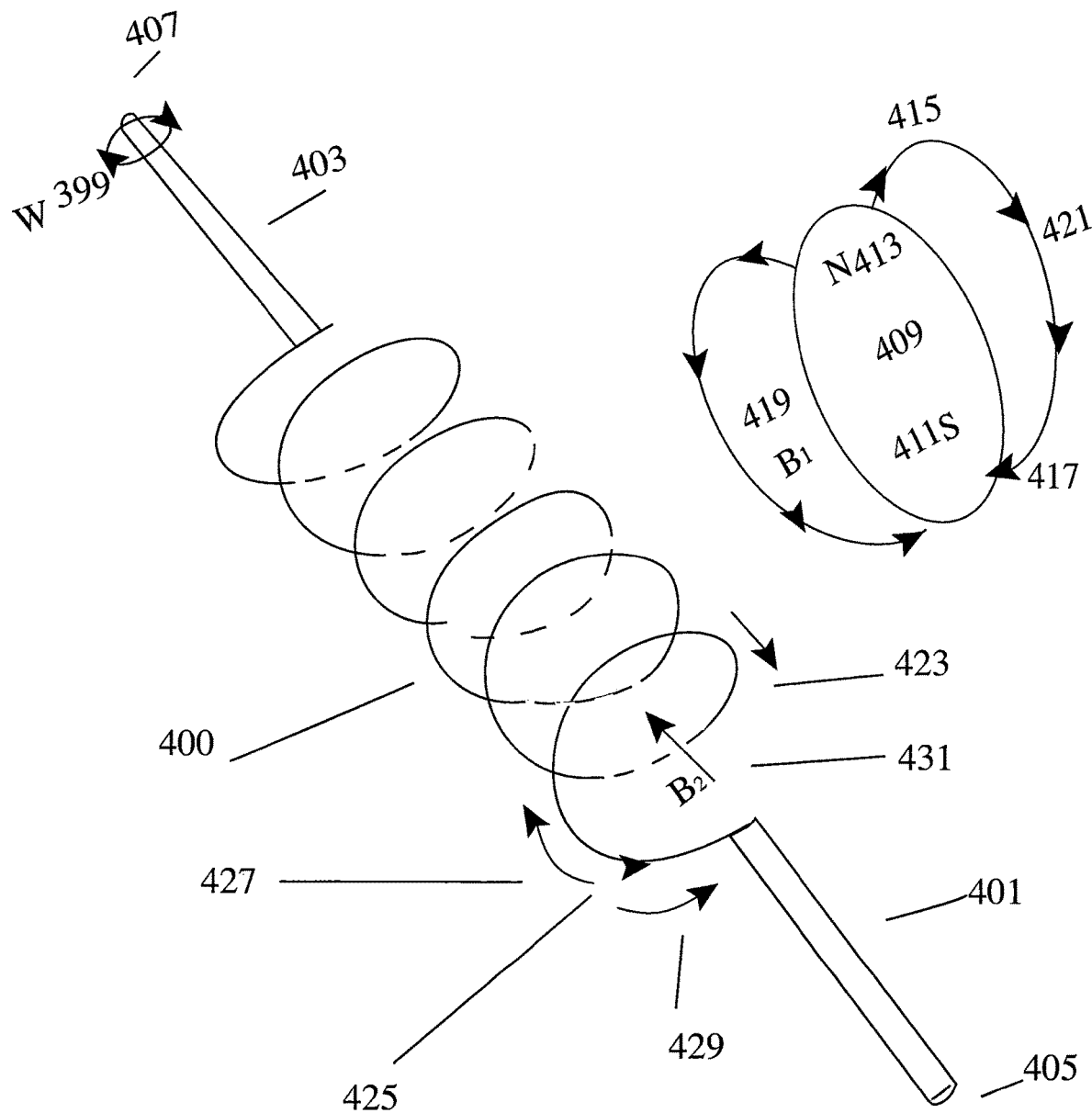

Referring to FIG. 11 what is shown is another version of the proposed invention. In this version of the invention the permanent magnet is fixed, and a cylindrical coil is mounted on a shaft and is the object that is initially spinning with rotational mechanical energy. Said rotational mechanical energy imparted by some known means. It compromises a shaft coil assembly including a first section of a shaft 401 which is mounted to a rigid cylindrical coil 400. Further included is a second section of shaft 403 which is mounted to the opposing end of said rigid cylindrical coil 400. The first section of shaft 401 has an end 405. The second section of shaft 403 has an end 407. The first and second sections of shaft have axes that are coincidental and lie along the same geometric line. Said rigid coil is cylindrical and the axis of its cylindrical structure lies along the same geometric line as the axes of said shaft sections. This is not completely necessary, but it does help when spinning at high speeds.

The ends of said shaft sections 405 and 407 are mounted on some bearing assemblies which are not shown in the Figure. Exterior to said cylindrical coil is a permanent magnet 409. Said permanent magnet 409 has a south pole 411 and a north pole 413. Said permanent magnet has a dipole magnetic field to its exterior which includes magnetic field lines 415 emanating from said north pole 413 and magnetic field lines 417 entering said south pole 411. Also shown are the magnetic field lines 419 and 421 extending from north to south along the exterior sides of the magnet.

Further included and not shown or seen in FIG. 11 is a means of mechanically spinning said shaft coil assembly at angular frequency ω 399.

In FIG. 11 when looking from the end 405 of said first shaft section 401 towards the end 407 of said second shaft section 403 imagine the shaft coil assembly is spinning in a clockwise direction. A first relevant magnetic field $B_1$ 419 exists in this system and that is the magnetic field due to said permanent magnet 409 and is the portion of the dipole field of said permanent magnet which is external to the physical volume of said permanent magnet.

As said shaft coil assembly is spinning a portion of the magnetic field 419 of said magnet is perpendicular to the path of said wire turn or coil winding. This perpendicular portion 419 of said magnetic field of said permanent magnet exerts a Lorentz force on electrons in said wire. This is seen when you look again along the line of said shaft coil assembly from the end 405 towards the opposing end. From this perspective said shaft coil assembly is spinning clockwise. The vector 423 in FIG. 11 is the velocity vector of the outer edge of the coil windings. This means that electrons in the material of said coil will have a net average velocity parallel to the vector 423 by virtue of the fact that they are in the solid material of said coil and are therefore by definition in the rotating frame of the coil as it is spinning. This velocity direction 423 is tangent to the path of said coil windings and perpendicular to a portion of said magnetic field 419.

The wire is chosen to be made of a material that has an electrical conductivity wherein the charge carrier giving it its conductivity is the negatively charged electrons in the material and the positive charge in said material for the most part cannot move for the nuclei are bound to the solid state lattice within the material. Thus, the material out of which said wire is composed must not have positive charge carriers such as positive ions or even holes as exist in semiconductors. Said Lorentz force gives electrons in said wire motion with the opposite directional sense as said spinning shaft coil assembly.

This means that in this example of FIG. 11 if one looks along the line of said shaft coil assembly from the end 405 towards the opposing end electrons will be caused to move in a counterclockwise direction. This direction is indicated by the arrow 425 in FIG. 11.

Since said counterclockwise motion of said electrons in said coil is due to the Lorentz force due to said perpendicular portion of said first relevant magnetic 419 field no work is done to give the electrons this motion because the Lorentz force does not do any work in deflecting the electrons. Although this is repetitive from the already discussed modes of the invention it is repeated because it is important to realize that this feature is present even when the magnet is stationary, and the coil is spinning. The fact that the Lorentz does no work is known to those skilled in the art of electromagnetism. It is because the differential element of work δw done by the Lorentz force is equal to $\delta w = (q \vec{v} \times \vec{B}) \cdot \delta \vec{r} = 0$. In this equation $\vec{v}$ is the velocity of the particle, q is the charge of the particle, and $\vec{B}$ is the magnetic field. Since we know $$\vec{v} = \frac{\delta \vec{r}}{\delta T}$$

it means $\vec{v}$ is parallel to $\delta \vec{r}$. Therefore since $(q\vec{v} \times \vec{B})$ is perpendicular to $\vec{v}$ it is also perpendicular to $\delta \vec{r}$ and so $(q\vec{v} \times \vec{B}) \cdot \delta \vec{r} = 0$. This last statement being true because the dot product of two perpendicular vectors is zero. So, while work must be done to give the shaft its mechanical motion, no work is done by said magnetic field to give the electrons their motion in the winding of wire. This feature as well makes this version of the proposed invention more efficient than previous electric generators. This is a novel feature of the proposed invention. Electrons are given their initial motion due to the Lorentz force and not due to Faraday's law. Again, now referring to FIG. 11 as one looks along the line of said shaft coil assembly from the end 405 towards the opposing end the motion of said electrons in said wire coil windings is counterclockwise indicated by the vector 425 which is tangent to the path of said wire. The motion of said electrons creates a second magnetic field $B_2$ 431. Said second magnetic field being generated by Ampere's law because of the motion of said electrons and said second magnetic field is parallel to said shaft coil assembly and in the volume within said windings of said coil and said second magnetic field is in a direction from the end 405 towards the end 407.

At this point it is important to note that the magnetic field in the physical matter of said permanent magnet does not play a role in this mode of the proposed invention and consequently it is not identified with a symbol or label in FIG. 11.

A novel unobvious feature of the proposed invention can be illustrated. Referring to FIG. 11 the magnetic flux through the cross-sectional area of said cylindrical coil windings 400 due to said second magnetic field $B_2$ will decrease with time as said shaft coil assembly begins to slow down due to friction. The decreasing with time of said magnetic flux through the circular cross section of said coil due to $B_2$ will cause an electric field E 427 to be created in space by way of Faraday's law. Said electric field E 427 will exert a force F 429 on said electrons moving in said coil wire 400. Since the force F 429 exerted on said electrons 425 is exerted in the same direction they are already moving Faraday's law of induction is fighting to keep the current going instead of serving as an agent slow it down. This feature is absent in the prior art. This is a unique form of positive electro-magnetic feedback in a Homopolar DC electric generator.

Figure 12:
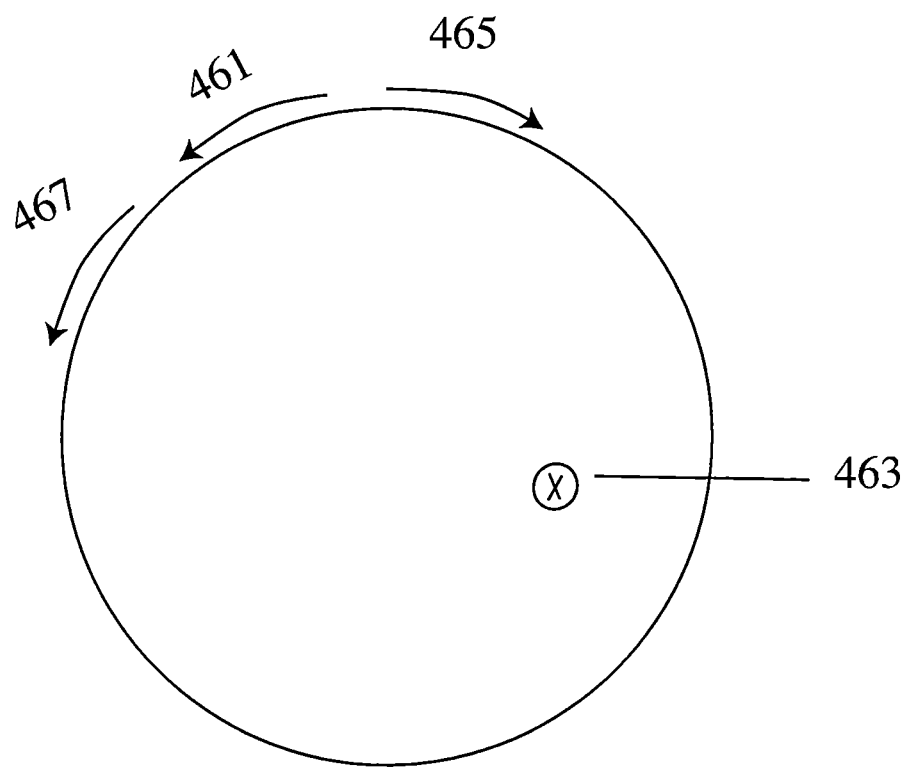

This described positive electro-magnetic feedback due to action of Faraday's Law specifically created by the proposed invention serving to enhance the electron flow in said coil described in FIG. 11 can be seen in FIG. 12 as well. FIG. 12 is a cross-sectional view of said coil as viewed from the perspective of the end 405 of said first shaft section 401 towards the opposing end 407. Also imagine that in FIG. 12 it is assumed that as we look into the page the coil is rotating counterclockwise. In FIG. 12 the electron flow is counterclockwise and is indicated by the arrow 461. The flow of said electrons 461 creates the magnetic field $B_2$ 463 which is into the page. As the spinning shaft coil assembly begins to slow because of friction the magnetic field 463 begins to decrease with time which causes an electric field 465 to be created in the clockwise direction in said coil windings. This electric field 465 exerts a force 467 on the electrons already circulating in the counterclockwise direction. Since the force 467 exerted on said electrons 461 is exerted in the same direction they are already moving Faraday's law of induction is fighting to keep the current going instead of serving as an agent slowing it down. Again, it is to be noted that this feature is absent in the prior art. This is positive electromagnetic feedback.

There is also an unobvious form of positive electromechanical feedback present in this version the proposed invention. As electrons are deflected by the perpendicular portion of said magnetic field they are given an impulse of momentum which pushes them in a counterclockwise direction around said loop when viewed for said first end 405. If the electrons in said coil are in a material that has very low electrical resistance this action of electron deflection by said magnetic field serves to give an equal and opposite impulse of momentum to said spinning coil. This means that in our example of FIG. 11 as electrons are deflected said shaft-coil assembly receives an impulse of angular momentum in the clockwise direction which is the direction it is already spinning. This is positive electro-mechanical feedback in a Homopolar DC electric generator.

Another important unobvious novelty of the proposed invention is that wire the loop develops a DC voltage by the action of the invention and as this electric energy is harvested to be used to charge batteries or whatever the use may be said wire loop or multiplicity of wire loops will have a zero output impedance and will thus have a high efficiency at transferring said electric energy.

Figure 13:
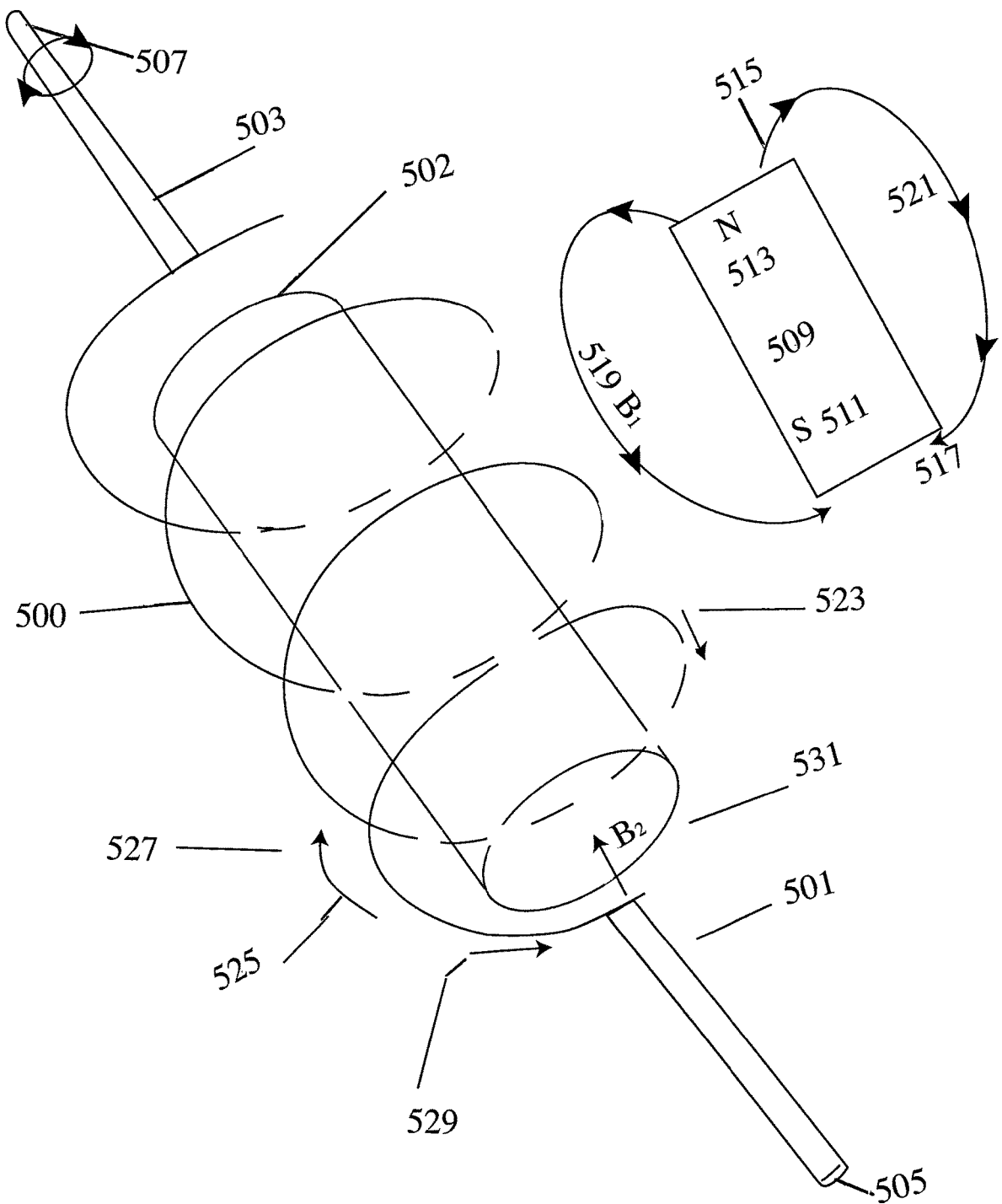

Referring to FIG. 13 what is shown is another version of the proposed invention. In this version of the invention the permanent magnet is fixed, and a cylindrical coil is mounted on a shaft and is the object that is initially spinning with rotational mechanical energy. It compromises a cylindrical shaft coil assembly including a first section of a shaft 501 which is mounted to a rigid cylindrical coil 500. Further included is a second section of shaft 503 which is mounted to the opposing end of said rigid cylindrical coil 500. The first section of shaft 501 has an end 505. The second section of shaft 503 has an end 507. The first and second sections of shaft have axes that are coincidental and lie along the same geometric line. The ends of said shaft sections 505 and 507 are mounted on some bearing assemblies which are not shown in the Figure. Further included within said cylindrical coil is a solid conducting cylinder 502 permanently affixed to the interior of said cylindrical coil. It is important that said solid cylinder is composed of a material that is an electrical conductor. It is further important that said cylinder and said coil are electrically isolated from one another. Also as said coil spins by way of the shaft axis assembly it is critical that said cylinder spins with it without slipping. So said cylindrical coil and said solid conducting cylinder constitute a composite rigid body. This being achievable by many known means. One example would be a cylindrical coil of wire with insulation on the surface of said wire wherein said wire is wrapped around a cylindrical shell composed of a nonconducting material such as glass, ceramic, or plastic. Then said solid conducting cylinder can be placed into the inside of said cylindrical shell. The inner annulus of said cylindrical shell can be attached to the by outer surface of said solid cylinder. The attachment can be made by way of epoxy or other mechanical attachment means such as screws, clamps, or clips. After the inclusion and attachment of said solid conducting cylinder into said cylindrical coil it is understood that said cylindrical shaft coil assembly includes said solid conducting cylinder embedded within said cylindrical conducting coil. The embodiments including said shaft sections, said rigid cylindrical conducting coil, and said solid conducting cylinder become a single composite embodiment which constitutes a composite rigid body identified as a rigid shaft-coil-cylinder assembly Exterior to said cylindrical coil is a permanent magnet 509. Said permanent magnet 509 has a south pole 511 and a north pole 513. Said permanent magnet has a dipole magnetic field to its exterior which includes magnetic field lines 515 emanating from said north pole 513 and magnetic field lines 517 entering said south pole 511. Also shown are the magnetic field lines 519 and 521 extending from north to south along the exterior sides of the magnet.

Further included and not shown or seen in FIG. 13 is a means of mechanically spinning said shaft coil assembly at angular frequency co 499.

In FIG. 13 when looking from the end 505 of said first shaft section 501 towards the end 507 of said second shaft section 503 imagine the shaft coil assembly is spinning in a clockwise direction. A first relevant magnetic field $B_1$ 519 exists in this system and that is the magnetic field due to said permanent magnet 509 and that is the portion of the dipole field 519 of said permanent magnet which is external to the physical volume of said permanent magnet.

As said rigid shaft-coil-cylinder assembly is spinning a portion of the magnetic field 519 of said magnet is perpendicular to the path of said wire turn or coil winding. This perpendicular portion 519 of said magnetic field of said permanent magnet exerts a Lorentz force on electrons in said wire. This is seen to be obvious when you look again along the line of said shaft coil assembly from the end 505 towards the opposing end. From this perspective said rigid shaft-coil-cylinder assembly is spinning clockwise. The vector 523 in FIG. 13 is the velocity vector of the outer edge of the coil windings. This means that electrons in the material of said coil will have a net average velocity parallel to the vector 523 by virtue of the fact that they are in the solid material of said coil and are therefore by definition in the rotating frame of the coil as it is spinning. This velocity direction 523 is tangent to the path of said coil windings and perpendicular to that portion of the magnetic field 519 which is perpendicular to the path of said wire.

The wire is chosen to be made of a material that has an electrical conductivity wherein the charge carrier giving it its conductivity is the negatively charged electrons in the material and the positive charge in said material for the most part cannot move for the nuclei are bound to the solid state lattice within the material. Thus, the material out of which said wire is composed must not have positive charge carriers such as positive ions or even holes as exist in semiconductors. Said Lorentz force gives electrons in said wire motion with the opposite directional sense as said spinning rigid shaft-coil-cylinder assembly.

This means that in this example of FIG. 13 if one looks along the line of said rigid shaft-coil-cylinder assembly from the end 505 towards the opposing end electrons will be caused to move in a counterclockwise direction. This direction is indicated by the arrow 525 in FIG. 13.

Since said counterclockwise motion of said electrons in said coil is due to the Lorentz force due to said perpendicular portion of said first relevant magnetic 519 field no work is done to give the electrons this motion because the Lorentz force does not do any work in deflecting the electrons. Although this is repetitive from the already discussed modes of the invention it is repeated because it is important to realize that this feature is present even when the magnet is stationary, and the coil is spinning. The fact that the Lorentz does no work is known to those skilled in the art of electromagnetism. It is because the differential element of work $\delta w$ done by the Lorentz force is equal to $\delta w = (q \vec{v} \times \vec{B}) \cdot \delta \vec{r} = 0$. In this equation $\vec{v}$ is the velocity of the particle, q is the charge of the particle, and $\vec{B}$ is the magnetic field. Since we know $$\vec{v} = \frac{\delta \vec{r}}{\delta T}$$

it means $\vec{v}$ is parallel to $\delta \vec{r}$. Therefore since $(q \vec{v} \times \vec{B})$ is perpendicular to $\vec{v}$ it is also perpendicular to $\delta \vec{r}$ and so $(q \vec{v} \times \vec{B}) \cdot \delta \vec{r} = 0$. This last statement being true because the dot product of two perpendicular vectors is zero. So, while work must be done to give the shaft its mechanical motion, no work is done by said magnetic field to give the electrons their motion in the winding of wire. This feature as well makes this version of the proposed invention more efficient than previous electric generators. This is a novel feature of the proposed invention. Electrons are given motion due to the Lorentz force and not due to Faraday's law. Again, now referring to FIG. 13 as one looks along the line of said rigid shaft-coil-cylinder assembly from the end 505 towards the opposing end the motion of said electrons in said wire coil windings is counterclockwise indicated by the vector 525 which is tangent to the path of said wire. The motion of said electrons creates a second magnetic field $B_2$ 531. Said second magnetic field being generated by Ampere's law because of the motion of said electrons and said second magnetic field is parallel to said rigid shaft-coil-cylinder assembly and in the volume within said windings of said coil and said second magnetic field is in a direction from the end 505 towards the end 507.

At this point it is important to note that the magnetic field in the physical matter of said permanent magnet does not play a role in this mode of the proposed invention and consequently it is not identified with a symbol or label in FIG. 13.

A novel unobvious feature of the proposed invention can now be illustrated. Referring to FIG. 13 the magnetic flux through the cross-sectional area of said cylindrical coil windings 500 due to said second magnetic field $B_2$ will decrease with time as said shaft coil assembly begins to slow down due to friction. The decreasing with time of said magnetic flux through the circular cross section of said coil due to $B_2$ will cause an electric field E 527 to be created in space by way of Faraday's law. Said electric field E 527 will exert a force F 529 on said electrons moving in coil wire 500. Since the force F 529 exerted on said electrons 525 is exerted in the same direction they are already moving Faraday's law of induction is fighting to keep the current going instead of serving as an agent slow it down. This is positive electro-magnetic feedback in a Homopolar DC electric generator. This feature is absent in the prior art.

Figure 14:
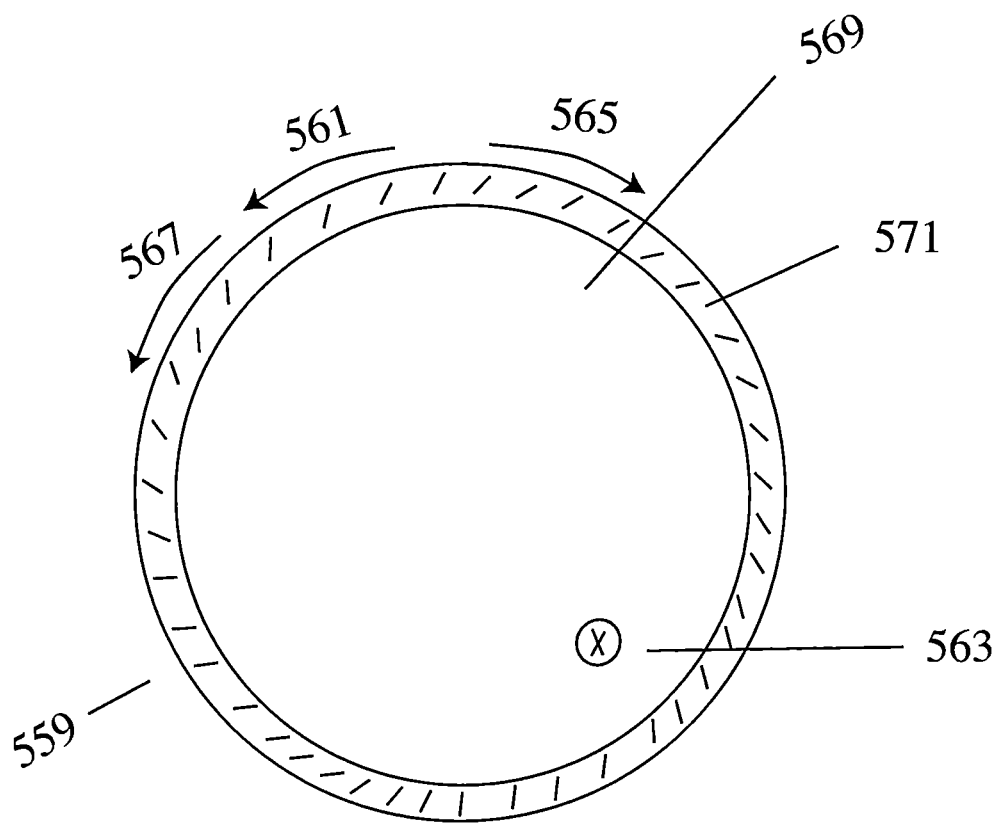

This described action of Faraday's Law serving to enhance the electron flow in said coil described in FIG. 13 can be seen in FIG. 14 as well. FIG. 14 is a cross-sectional view of said coil as viewed from the perspective of the end 505 of said first shaft section 501 towards the opposing end 507. The Figure shows a coil winding 559 and further includes said non-conducting cylindrical shell 571 about which said coil is wound. Also shown in FIG. 14 is the circular cross section 569 of said solid conducting cylinder. Also imagine that in FIG. 14 it is assumed that as we look into the page the coil is rotating clockwise. In FIG. 14 the electron flow in said coil is counterclockwise and is indicated by the arrow 561. The flow of said electrons 561 creates the magnetic field $B_2$ 563 which is into the page. As the spinning shaft coil assembly begins to slow because of friction the magnetic field 563 begins to decrease with time which causes an electric field 565 to be created in the clockwise direction in said coil windings. This electric field 565 exerts a force 567 on the electrons already circulating in the counterclockwise direction. Since the force 567 exerted on said electrons 561 is exerted in the same direction they are already moving Faraday's law of induction is fighting to keep the current going instead of serving as an agent slowing it down. Again, it is to be noted that this feature is absent in the prior art. This is positive electro-mechanical feedback in a Homopolar DC electric generator.

Figure 15:
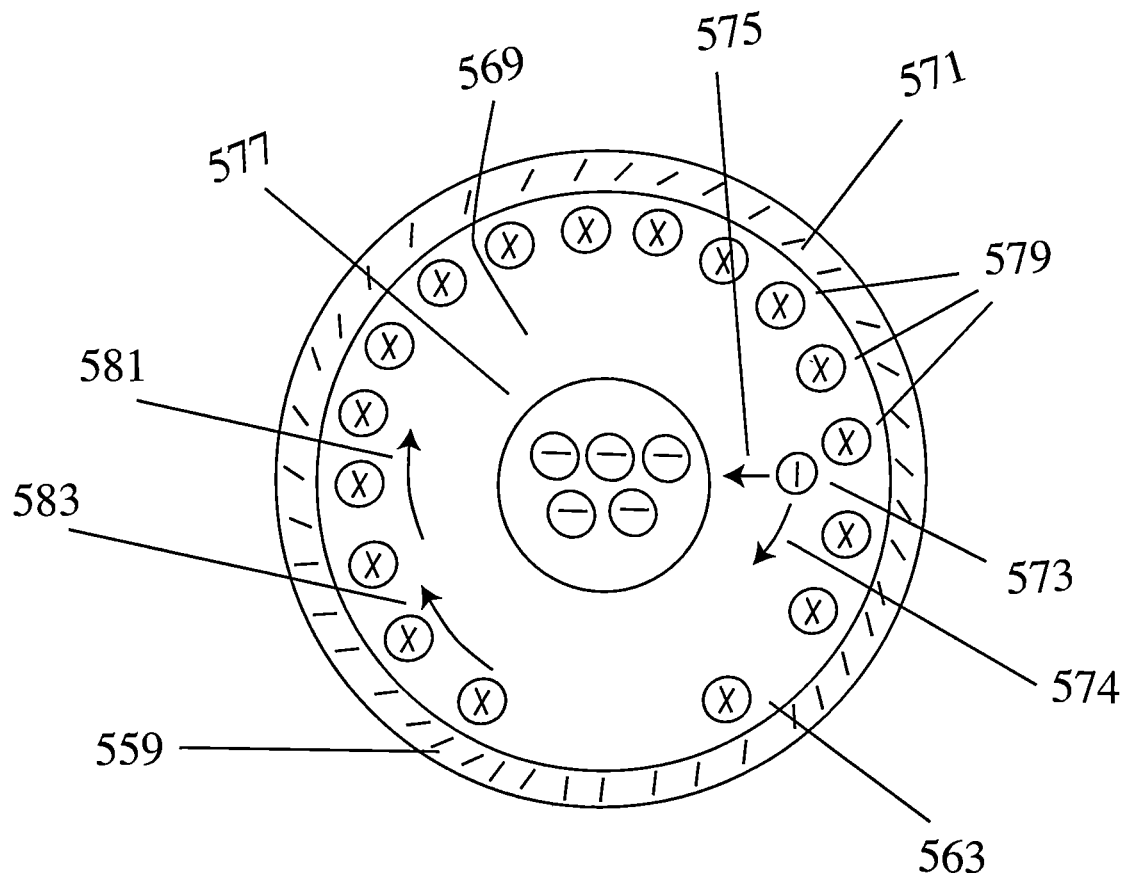

At this point yet another unobvious novel feature of this version of the spinning rigid shaft-coil-cylinder assembly can be illustrated and the reason for the inclusion of said solid cylindrical conductor within said coil can be elucidated. To this end FIG. 15 was created. FIG. 15 is a replica of FIG. 14 with additional features included which involve the activity of the electrons in said solid conducting cylinder as the invention is operating. Referring to FIG. 15 we can imagine for a brief moment that we are looking at the cross section of said coil and said solid cylinder from said first shaft section towards the opposing end of said shaft coil assembly. Again, we imagine that as we look into the page said coil is spinning clockwise. In FIG. 15 what is shown is said non-conducting cylindrical shell 571 about which said coil 559 is wound, and also shown is the circular cross section 569 of said solid conducting cylinder. Referring to FIG. 15, a typical electron 573 in said solid conducting cylinder has a net average velocity 574 in the clockwise direction by virtue of the fact that said solid conducting cylinder is rotating clockwise. Because of the presence of the magnetic field $B_2$ 563 electrons 573 in the solid moving in the clockwise direction 574 experience a Lorentz force 575 towards the center of said solid conducting cylinder causing an accumulation of negative charge 577 at said center. Because said solid conducting cylinder is electrically neutral this electron migration towards leaves the peripheral edge if said solid conducting cylinder with positively charged regions 579. As the magnetic field $B_2$ begins to decrease with time because the counterclockwise circulation of electrons in the coil begins to decrease as the rotation of the system slows, and electric field E 581 is created in the clockwise direction because of Faraday's Law. This electric field exerts a force F 583 in the clockwise direction on said positively charged regions at the peripheral edge of said solid conducting cylinder. This force F 583 results in a mechanical torque on the rotating system which serves to accelerate the clockwise angular acceleration of the system which is the direction the system is already spinning. Thus, Faraday's Law serves to keeping the system spinning clockwise rather than slowing down its clockwise rotation. This is positive electro-mechanical feedback in a Homopolar DC electric generator.

It should be noted that the positive electromechanical feedback present in the previous version of the proposed invention wherein the coil is empty is also present in the version wherein the coil has a solid cylindrical conductor within it. Referring to FIG. 16 what is shown is the cross section of said coil 601 as viewed from the first shaft section towards the opposing end. As electrons in said coil 603 experience a sudden force of deflection 605 in the counterclockwise direction due to the Lorentz Force as discussed this results in an impulse of clockwise angular momentum. If the electrons in said coil are in a material that has very low electrical resistance this action of electron deflection by said magnetic field serves to give an equal and opposite impulse of momentum to said spinning coil. This means that in our example of FIG. 16 as electrons are deflected said rigid shaft-coil-cylinder assembly receives an impulse of angular momentum in the clockwise direction which is the direction it is already spinning. This is positive electro-mechanical feedback in a Homopolar DC electric generator. Thus, the version of the invention as described in FIGS. 13-16 has two independent modes of positive electro-mechanical feedback.

FIGS. 11-16 provide a description of two modes of the proposed wherein said coil is spinning and said permanent magnet is at rest.

Another important unobvious novelty of the proposed invention is that wire the loop develops a DC voltage by the action of the invention and as this electric energy is harvested to be used to charge batteries or whatever the use may be said wire loop or multiplicity of wire loops will have a zero output impedance and will thus have a high efficiency at transferring said electric energy.

In all of the homopolar DC electric generators described it is possible because of vibrations and turbulence therefrom that there will be stray magnetic flux through the area of said conductive loop that will cause some negative electromagnetic feedback which will cause the DC flow of electrons in said conducting loop to be downgraded. To eliminate this unwanted negative feedback a diode can placed in said conductive loop or wire, and said diode is placed with the bias direction so that electrons can only flow in one direction, and said diode has a bias to allow electrons to flow through said conductive loop in the same directional sense that said shaft-magnet system is spinning, whereas if one looks at said conducting path in a direction from the first end of said shaft towards the second end of said shaft and said shaft-magnet system is spinning counterclockwise, said diode is placed in said conducting with a bias to allow electrons to flow in the counterclockwise direction as viewed from the first end of said shaft towards the second end of said shaft, and again if one looks at said conducting path in a direction from the first end of said shaft towards the second end of said shaft and said shaft-magnet system is spinning clockwise, said diode is placed in said conducting with a bias to allow electrons to flow in the clockwise direction as viewed from the first end of said shaft towards the second end of said shaft, whereas said diode prevents any negative electro-magnetic feedback in the different designs of said DC Homopolar electric generators.

The invention as disclosed has many other derivatives and extensions and is not to be judged by the above description but is rather to be judged on the basis of the appended claims.

What is claimed is:

1. A homopolar DC electric generator comprising:
   (a) A shaft mounted on a bearing assembly wherein said shaft is free to spin about an axis running through its length, and said shaft having a first end and a second end, and
   (b) a permanent magnet mounted on said shaft wherein said shaft and said magnet form a composite rigid body which is a shaft-magnet assembly, and
   (c) said permanent magnet having a north pole and a south pole, and
   (d) a conductive path comprising a conducting wire or conducting winding or conducting coil wherein said conducting path surrounds said permanent magnet and the axis of said shaft at least once, and said path traces out an area A (e) a first magnetic field $B_1$ being the magnetic field due to said permanent magnet which is exterior to the physical boundary of said permanent magnet and a portion of said first magnetic field being perpendicular to a portion of said conducting path, and means for spinning said shaft-magnet system so that it has an angular frequency about the axis of said shaft and said shaft-magnet system has rotational mechanical kinetic energy, and (f) as said shaft-magnet system is spinning the magnetic flux through the area A due to said first magnetic field $B_1$ has a derivative with respect to time which is equal to zero, and (g) whereupon as said shaft-magnet system is spinning said first magnetic field exerts a Lorentz Force on electrons within said conducting path which causes electrons to move within said conducting path with the same sense of circulation as said spinning shaft for instance if one looks along said shaft from the first end of said shaft towards the second end of said shaft and sees said shaft is spinning counterclockwise said Lorentz Force causes said electrons to move counterclockwise through and along said conducting path, and if one looks along said shaft from the first end of said shaft towards the second end of said shaft and sees said shaft is spinning clockwise said Lorentz Force causes said electrons to move clockwise through and along said conducting path, and said Lorentz Force that causes the motion of said electrons in said conducting path being a result effective Lorentz Force operating in said invention and therefore is identified as a first Lorentz Force, and (h) said motion of said electrons in said conducting loop creating a second magnetic field $B_2$ being parallel to the axis of said shaft, and (i) said motion of said electrons being electrical energy and said rotational mechanical kinetic energy being converted into electrical energy, and (j) as the rotational angular frequency of said spinning shaft-magnet system begins to decrease due to friction, the second magnetic field $B_2$ begins to decrease with time, and the magnetic flux through said area $A_1$ due to said second magnetic field $B_2$ begins to decrease with time, and Faraday's Law produces an electric field E that circulates around said spinning shaft system with a circulation sense opposite to that of said spinning shaft-magnet system wherein if said spinning shaft system is seen to be spinning counterclockwise said circulating electric field will have a circulation direction which is clockwise and if said spinning shaft system is seen to be spinning clockwise said circulating electric field will have a circulation direction which is counterclockwise, and said circulating electric field exerts a force on said electrons in said conducting path in a direction they are already moving and this is a manifestation of positive electromagnetic feedback in a Homopolar DC electric generator, and (k) wherein said south pole of said permanent magnet faces said first end of said shaft, and when viewed from the first end of said shaft towards the second end of said shaft, said shaft-magnet system is spinning counterclockwise, and a third magnetic field exists $B_3$ being the magnetic field within the physical boundary of said permanent magnet and pointing in a direction from said south pole towards said north pole within the physical boundary of said permanent magnet and a portion of said third magnetic field $B_3$ being parallel to the axis of said shaft and said component of $B_3$ parallel to the axis of said shaft pointing in a direction from the first end of said shaft towards the second end of said shaft, and the component of $B_3$ which is pointing in a direction from the first end of said shaft towards the second end of said shaft is pointing in the same direction as said second magnetic field $B_2$ which is caused by the circulation of said electrons through said conducting path, and said conducting path is made of a material which is an electrical conductor where the charge carrier is the electron, and said shaft is made of a material which is not an electrical conductor, and said permanent magnet is made of a material which is an electrical conductor, and said permanent magnet is made of a material which is an electrical conductor wherein the charge carrier is the electron, and said permanent magnet and said conducting path are electrically isolated from one another so that no electrons can flow therebetween, and as said shaft is spinning with its counterclockwise sense as seen when looking from the first end of said shaft towards the second end of said shaft, electrons within the physical body of said permanent magnet experience a Lorentz Force from both $B_2$ and the component of $B_3$ which parallel to the axis of said shaft, and said Lorentz Force on said electrons within the physical body of said permanent magnet being a result effective Lorentz force operating in said invention and therefore is identified as a second Lorentz Force so as to distinguish it from said First Lorentz Force, and said second Lorentz Force which acts on said electrons within the physical boundary of said permanent magnet pushes said electrons away from the axis of said shaft causing a population of negatively charged electrons to assemble near the outer surface of said permanent magnet leaving the volumetric region near the axis of said shaft within the physical body of said permanent magnet positively charged, and wherein as the rotational angular frequency of said spinning shaft-magnet system begins to decrease due to friction, said second magnetic field $B_2$ begins to decrease with time, and the magnetic flux through said area $A_1$ due to said second magnetic field $B_2$ begins to decrease with time, and Faraday's Law produces an electric field E that circulates around said spinning shaft system with a circulation sense which is clockwise which is the opposite sense with respect to said counterclockwise spinning shaft-magnet system when viewed from the first end of said shaft towards the second end of said shaft, and said circulating electric field exerts a force on said population of negatively charged electrons assembled near the outer surface of said permanent magnet, and said force on said population of negatively charged electrons assembled near the outer surface of said permanent magnet results in a mechanical torque on said spinning shaft-magnet system which serves to keep it spinning in the direction it is already spinning therefore this result is a DC homopolar electric generator with positive electromechanical feedback.

2. The homopolar DC electric generator of claim 1 wherein as the rotational angular frequency of said spinning shaft-magnet system begins to decrease due to friction, the second magnetic field $B_2$ begins to decrease with time, and the magnetic flux through said area $A_1$ due to said second magnetic field $B_2$ begins to decrease with time, and Faraday's Law produces an electric field E that circulates around said spinning shaft system with a circulation sense opposite to that of said spinning shaft system wherein if said spinning shaft system is seen to be spinning counterclockwise said circulating electric field will have a circulation direction which is clockwise and if said spinning shaft system is seen to be spinning clockwise said circulating electric field will have a circulation direction which is counterclockwise, and said circulating electric field exerts a force on said electrons in a direction they are already moving, and said conducting path is made of a material which is an electrical conductor where the charge carrier is the electron, and said shaft is made of a material which is not an electrical conductor, and said permanent magnet is made of a material which is an electrical conductor wherein the charge carrier is the electron, and said permanent magnet and said conducting path are electrically isolated from one another so that no electrons can flow therebetween.

3. The homopolar DC electric generator of claim 1 wherein south pole of said permanent magnet faces the first end of said shaft and when viewed from the first end of said shaft towards the second end of said shaft, said shaft-magnet system is spinning counterclockwise, and a third magnetic field exists $B_3$ being the magnetic field within the physical boundary of said permanent magnet and pointing in a direction from said south pole towards said north pole within the physical boundary of said permanent magnet and a portion of said third magnetic field $B_3$ being parallel to the axis of said shaft and said component of $B_3$ parallel to the axis of said shaft pointing in a direction from the first end of said shaft towards the second end of said shaft, and the component of $B_3$ which is pointing in a direction from the first end of said shaft towards the second end of said shaft is pointing in the same direction as said second magnetic field $B_2$ which is caused by the circulation of said electrons through said conducting path, and said conducting path is made of a material which is an electrical conductor where the charge carrier is the electron, and said shaft is made of a material which is not an electrical conductor, and said permanent magnet is made of a material which is an electrical conductor wherein the charge carrier is the electron, and said permanent magnet and said conducting path are electrically isolated from one another so that no electrons can flow therebetween, and as said shaft is spinning, with its counterclockwise sense as seen when looking from the first end of said shaft towards the second end of said shaft, electrons within the physical body of said permanent magnet experience a Lorentz Force from both $B_2$ and the component of $B_3$ which is parallel to the axis of said shaft, and said Lorentz Force on said electrons within the physical body of said permanent magnet being a result effective Lorentz force operating in said invention and therefore is identified as a second Lorentz Force so as to distinguish it from said First Lorentz Force in One, and said second Lorentz Force which acts on said electrons within the physical boundary of said permanent magnet pushes said electrons away from the axis of said shaft causing a population of negatively charged electrons to assemble near the outer surface of said permanent magnet leaving the volumetric region near the axis of said shaft within the physical body of said permanent magnet positively charged, and wherein as the rotational angular frequency of said spinning shaft-magnet system begins to decrease due to friction, said second magnetic field $B_2$ begins to decrease with time, and the magnetic flux through said area $A_1$ due to said second magnetic field $B_2$ begins to decrease with time, and Faraday's Law produces an electric field E that circulates around said spinning shaft system with a circulation sense which is clockwise which is the opposite sense with respect to said counterclockwise spinning shaft-magnet system when viewed from the first end of said shaft towards the second end of said shaft, and said circulating electric field exerts a force on said population of negatively charged electrons assembled near the outer surface of said permanent magnet, and said force on said population of negatively charged electrons assembled near the outer surface of said permanent magnet results in a mechanical torque on said spinning shaft-magnet system which serves to keep it spinning in the direction it is already spinning therefore this result is a manifestation of positive electromechanical feedback, and said electric field exerts a force on said electrons in said conducting path in a direction they are already moving and this result is a manifestation of positive electromagnetic feedback, thus this is a DC homopolar electric generator with positive electromagnetic and positive electromechanical feedback.

4. The homopolar DC electric generator of claim 1 wherein said conducting path has a first end and a second end and when said first and second ends are attached to the two terminals of an electrical device said generator drives electrons through said device.

5. The homopolar DC electric generator of claim 1 wherein said conducting path comprises a multiplicity of turns of wire which circumferentially surround the axis of said shaft.

6. The homopolar DC electric generator of claim 1 wherein said conducting path comprises a multiplicity of circular turns of wire which circumferentially surround the axis of said shaft, and said circular turns of said wire form a cylindrical coil and said cylindrical coil forms a coil volume and said permanent magnet is completely enclosed within said coil volume.

7. The homopolar DC electric generator of claim 1 wherein said conducting path comprises a multiplicity of circular turns of wire which circumferentially surround the axis of said shaft, and said circular turns of said wire form a cylindrical coil and said cylindrical coil forms a coil volume and said permanent magnet is completely enclosed within said coil volume, and each circular wire turn forms an area and the magnetic flux through the area of each circular wire turn due to the magnetic field of said permanent magnet is constant with respect to time when shaft is stationary and when shaft is spinning, thereby minimizing electro-magnetic drag from Faraday's law.

8. The homopolar DC electric generator of claim 1 wherein said conducting path comprises a multiplicity of circular turns of wire which circumferentially surround the axis of said shaft, and said circular turns of said wire form a cylindrical coil and said cylindrical coil forms a coil volume and said permanent magnet is completely enclosed within said coil volume, and each circular wire turn forms an area and the magnetic flux through the area of each circular wire turn due to the magnetic field of said permanent magnet is constant with respect to time when shaft is stationary and when shaft is spinning, thereby minimizing electro-magnetic drag from Faraday's law, and said coil volume is a cylindrical volume which has a geometric cylindrical surface area which is defined as the coil surface area $A_C$ wherein $A_C$ defines said coil volume, and the magnetic flux through said coil surface area $A_C$ due to the magnetic field of said permanent is zero.

9. The homopolar DC electric generator of claim 1 wherein A is as large as possible without said permanent magnet coming in contact with said conducting path as said shaft-magnet system is spinning.

10. The homopolar DC electric generator of claim 1 wherein a diode is placed in said conductive path, loop, or wire, and said diode is placed with the bias direction so that electrons can only flow in one direction, and said diode has a bias to allow electrons to flow through said conductive path in the same directional sense that said shaft-magnet system is spinning, whereas if one looks at said conducting path in a direction from the first end of said shaft towards the second end of said shaft and said shaft-magnet system is spinning counterclockwise, said diode is placed in said conducting path with a bias to allow electrons to flow in the counterclockwise direction as viewed from the first end of said shaft towards the second end of said shaft, and again if one looks at said conducting path in a direction from the first end of said shaft towards the second end of said shaft and said shaft-magnet system is spinning clockwise, said diode is placed in said conducting path with a bias to allow electrons to flow in the clockwise direction as viewed from the first end of said shaft towards the second end of said shaft, whereas said diode minimizes negative electro-magnetic feedback in said Homopolar DC electric generator.

* * * * *